United States Patent [19]

Jen

[11] 4,204,777
[45] May 27, 1980

[54] MATRIX PRINTER CONTROL SYSTEM
[75] Inventor: Tai-Kuang Jen, Ithaca, N.Y.
[73] Assignee: NCR Corporation, Dayton, Ohio
[21] Appl. No.: 869,888
[22] Filed: Jan. 16, 1978
[51] Int. Cl.² .............................................. B41J 3/10
[52] U.S. Cl. ................................ 400/124; 101/93.05; 400/322; 400/323; 400/342
[58] Field of Search ......................... 101/93.05; 364/900 MS File; 400/124, 126, 320, 322, 323, 342

[56] References Cited
U.S. PATENT DOCUMENTS

| | | | |
|---|---|---|---|
| 3,789,272 | 1/1974 | Voll Hardt | 361/154 |
| 3,789,969 | 2/1974 | Howard et al. | 400/124 |
| 3,833,891 | 9/1974 | Howard et al. | 364/900 |
| 3,858,703 | 1/1975 | Duley | 400/124 |
| 3,993,181 | 11/1976 | Potma et al. | 400/124 |
| 4,024,506 | 5/1977 | Spaargaren | 101/93.04 X |
| 4,058,195 | 11/1977 | Fravel et al. | 400/144.2 X |
| 4,116,567 | 9/1978 | San Pietro | 400/124 |

Primary Examiner—Paul T. Sewell
Attorney, Agent, or Firm—J. T. Cavender; Wilbert Hawk, Jr.; George J. Muckenthaler

[57] ABSTRACT

A system of controlling the operation of a matrix printer wherein printing is performed in each direction of travel of a printing element carriage. A printer control large scale integrated device is combined with a programmable character memory device and associated circuits for responding to character code data and to the position of the printing carriage and the direction of travel thereof. Code data is input in character by character format and, by means of counters and latching devices, the pulses or signals are sent to the respective printing elements for actuation thereof for printing the dots of a matrix character.

16 Claims, 23 Drawing Figures

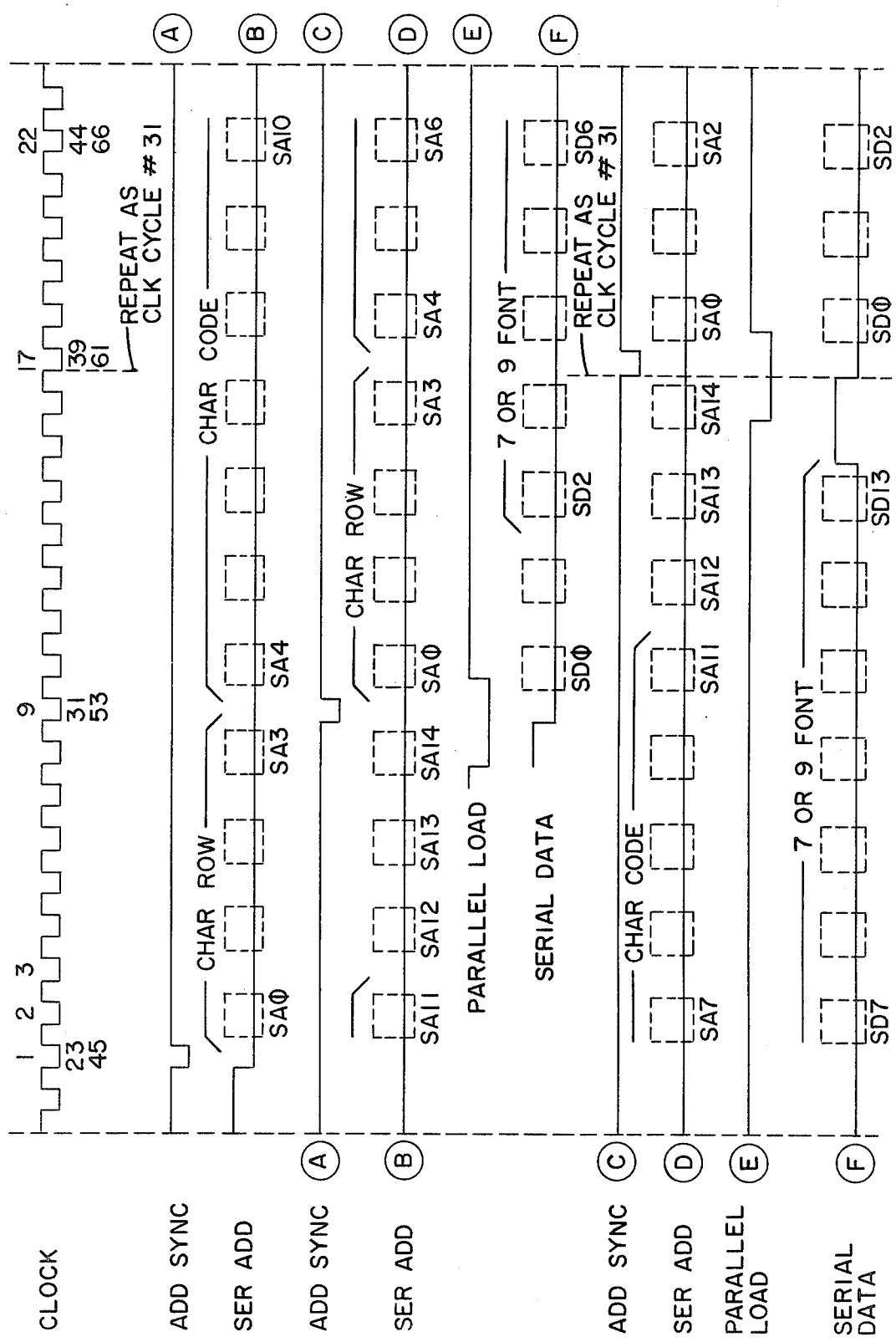

MATRIX PRINTER CONTROL SYSTEM

BACKGROUND OF THE INVENTION

In the field of matrix printers, it is, of course, well known that a printer may include one or more print heads which are caused to be moved in a reciprocating manner across the printer for printing in serial fashion. The print head may be moved by a cable and pulley arrangement, a lead screw, or a cam drive or like drive mechanism. Each of the print heads includes a plurality of printing elements supported in a group and each of the elements is actuated or energized at high speed to cause printing of dots in a matrix character by movement of dot-making elements including droplets of ink or printing wires, attached to the printing elements, and wherein the wires or droplets are caused to be impacted against the paper. The print wires or ink jet nozzles are usually closely spaced in vertical manner so as to print the dots which make up the characters as the print heads are moved across the printer. In this manner, a line of printed characters is completed upon travel of the print head in one direction across the paper. Printing may also be performed in the other direction if the required controls are included in the printer.

Another form of matrix printer includes the use of a plurality of printing elements supported from a carriage in a manner wherein the printing elements are aligned horizontally across the printer and upon each pass of the carriage, respective dots of characters are printed in a line or row and subsequent passes of the carriage and printing elements cause additional lines of dots to be printed to complete the dot matrix characters in the line of printing. Common arrangements include the use of four or eight printing elements supported from the carriage.

A timing strip with slots or like indicia is commonly used to dictate actuation of the printing elements wherein one or more sensors sense the slots or other indicia to print dots in precise columns across the paper. While the printing has usually been performed in one direction, for example, left to right, it is more recently that printing has been done in both directions of travel of the printing element carriage.

The control systems for matrix printers have included input converters, shift registers, buffer storage, character generators and solenoid or other print element drivers for printing a line of dots in successive manner across the paper to form a line of characters.

Representative prior art relating to control systems for matrix printers include U.S. Pat. No. 3,703,949 issued to R. Howard et al. on Nov. 28, 1972, wherein input information is loaded into a buffer in parallel and printing does not begin until the buffer is loaded to print a complete line. Detection of the location of the carriage moving the print head is performed independent of the carriage to actuate the print wires at the appropriate locations.

U.S. Pat. No. 3,719,781 issued to J. R. Fulton et al. on Mar. 6, 1973, shows a control system having a line relay for receiving the input signal, an input clock and a shift register as a buffer store, an operational store, a load detector, and operational control means to actuate the printer.

U.S. Pat. No. 3,789,969 issued to R. Howard et al. On Feb. 5, 1974, shows a control system wherein input data is fed in parallel into a multistage shift register, the output going to a character generator to provide signals representing a line of dots for the characters to be printed, and which trigger the operation of the print wire solenoids.

U.S. Pat. No. 3,833,891 issued to R. Howard et al. on Sept. 3, 1974 shows input data into a multistage shift register, selected stages of the register applied to a character generator to form signals representing the top line of characters to trigger operation of the print wire solenoids.

U.S. Pat. No. 3,834,304 issued to J. T. Potter on Sept. 10, 1974 shows logic circuits which include a read only memory for storing signal sets representing dot patterns to be printed in rows. The sets are read out to shift registers to control actuation of the hammers.

U.S. Pat. No. 3,858,703 issued to H. Duley on Jan. 7, 1975 discloses a bi-directional dual head printer which uses a registration strip with a plurality of equally spaced narrow transparent slots and wherein a recirculating shift register stores all of the characters until a full line of characters is printed.

U.S. Pat. No. 3,941,051 issued to G. B. Barrus et al. on Mar. 2, 1976, shows a printer system of bi-directional printing wherein a reciprocating shuttle system forms part of a dynamically balanced system wherein a cam motion engages an oppositely moving counterweight system.

U.S. Pat. No. 3,970,183 issued to P. Robinson on July 20, 1976 shows a bi-directional printer wherein monitoring is performed by detecting both the direction of print head movement and print head position at any time. Information is detected by a pair of optical channels and the registration strip has a pair of displaced sets of transparent slots therein. Circuitry is provided for storing data representing the next line to be printed in both the forward and the reverse formats.

U.S. Pat. No. 3,991,868 issued to P. Robinson et al. on Nov. 16, 1976 discloses printing of double and triple sized characters in segments which are stored in readable memories. The apparatus comprises a shift register having a plurality of stages equal to the number of standard size characters capable of being printed along a single line.

U.S. Pat. No. 4,024,506 issued to H. Spaargaren on May 17, 1977 shows control devices which include a starting position device, an address counter, a buffer store, a character generator and a row counter and column counter.

And, U.S. Pat. No. 4,026,402 issued to W. J. Byrd on May 31, 1977 shows a line printer which provides for either a single character or a burst of characters and a registration system serves the dual function of locating the proper position for a character to be printed and determining the direction of movement of the print head. A storage capability is in a recirculating memory and the data memory is a multistage shaft register which tracks the data in the recirculating memory.

SUMMARY OF THE INVENTION

The present invention relates to a matrix printer and more particularly, to a control system for the printer. A plurality of printing elements are aligned across the printer and are supported from a printing element carriage which is caused to be moved a precise distance in back and forth or reciprocating manner across the printer, such movement being transverse to the direction of paper movement. Upon such movement of the printing element carriage, printing is performed in each direction of travel thereof with the paper being advanced a precise distance at the end of printing in each such direction.

In one preferred embodiment of the present invention, a print wire is secured to each printing element whereupon actuation of each printing element causes its print wire to be impacted against paper, ribbon and a platen to print a dot on the paper. Another preferred embodiment of the invention includes the use of ink jet nozzles for causing droplets of ink to be impacted against or deposited on the paper. In each instance, the dots are serially deposited as the printing element carriage travels approximately one inch in such reciprocating manner so that in a standard 5×7 or 7×7 matrix character the carriage makes seven passes to complete a line of printing. Of course, to provide for space between the lines of printing, the carriage oscillates two times during which time the paper is advanced two dot spaces in a vertical direction before printing of a next line of characters is started.

A timing strip is mounted on the printing element carriage, the timing strip having a plurality of slots therein and a home position at each end of the strip, such home positions being designated a HOME 1 and a HOME 2, with the HOME 1 position being a window or aperture in the timing strip at the left hand end thereof and the HOME 2 position being a web or blank area on the timing strip at the right hand end thereof. The HOME 1 and HOME 2 positions are recognized by the printer control logic as turn around points for the carriage and the printing elements. An optical sensor is carried by or supported from the printer and is in the form of a light emitting diode of the interruptor type wherein either edge of each slot can trigger the sensor to initiate a character dot pulse or signal. If the sensor does not sense either edge of a slot, that is, if no pulse is received within a predetermined time, the printer is in a home position. As mentioned above, the HOME 1 position is a light or window area and the HOME 2 position is a dark or solid area, which home positions are detected and the direction of movement of the printing element carriage is read by the printer control logic.

When the printer is turned on, the carriage oscillates twice and the paper is advanced two dot spaces. The optical sensor senses the slots in the timing strip and also senses the home positions to determine the direction of movement of the printing element carriage. The input print data is received into an access memory and the control data is received into a programmable logic array unit. Each printing element can print ten characters in a line, and prior to each printing of the dots in each character, the data stored in the access memory is removed therefrom and is sent to the character read memory to generate a dot row for each character and for each printing element to print. The dot row data for each character is loaded into each dot data register and according to the direction of carriage movement, the dot row data is loaded either forward or backward into the registers. Each of the dot positions generates a hammer pulse which fires the respective printing elements on the presence of each dot of a dot row. A counter counts the number of home positions for the number of carriage oscillations to complete a line of printed characters.

In view of the above discussion, the principal object of the present invention is to provide a control system for operating a printer in bi-directional printing.

An additional object of the present invention is to provide a control system for a matrix printer wherein certain of the control devices can be programmed for several printing patterns.

Another object of the present invention is to provide a method for controlling a matrix printer in bi-directional printing wherein an optical device senses the dot positions of the characters and the home position of the printing elements.

A further object of the present invention is to provide a method for controlling a matrix printer wherein a printer control device and a character memory device are programmable for a plurality of printing patterns.

Another object of the present invention is to provide a control system for a matrix printer wherein data is input to a control printer device, and character and directional information is sent to a read only memory device with dot, character font and last row information being sent from the memory device to the control printer device with subsequent pulsing for actuation of the printing elements.

A further object of the present invention is to provide a control system capable of generating mixed width font characters in the same line of printing.

Another object of the present invention is to provide a read only memory device in the control system of a matrix printer which is capable of forming or generating a double width character matrix.

A further object of the present invention is to provide a read only memory device for generating additional dots for a wider character font.

Another object of the present invention is to provide a control printer device which is capable of handling a plurality of different font characters in various width and height matrix.

Additional advantages and features of the present invention will become apparent and fully understood from a reading of the following specification taken together with the annexed drawing.

DESCRIPTION OF THE DRAWING

FIG. 1A is an enlarged view of the timing strip and sensing means;

FIG. 1B is an end view of the structure shown in FIG. 1A;

FIG. 7 is a timing diagram of the address and the data;

DESCRIPTION OF THE PREFERRED EMBODIMENT

Figure 1:
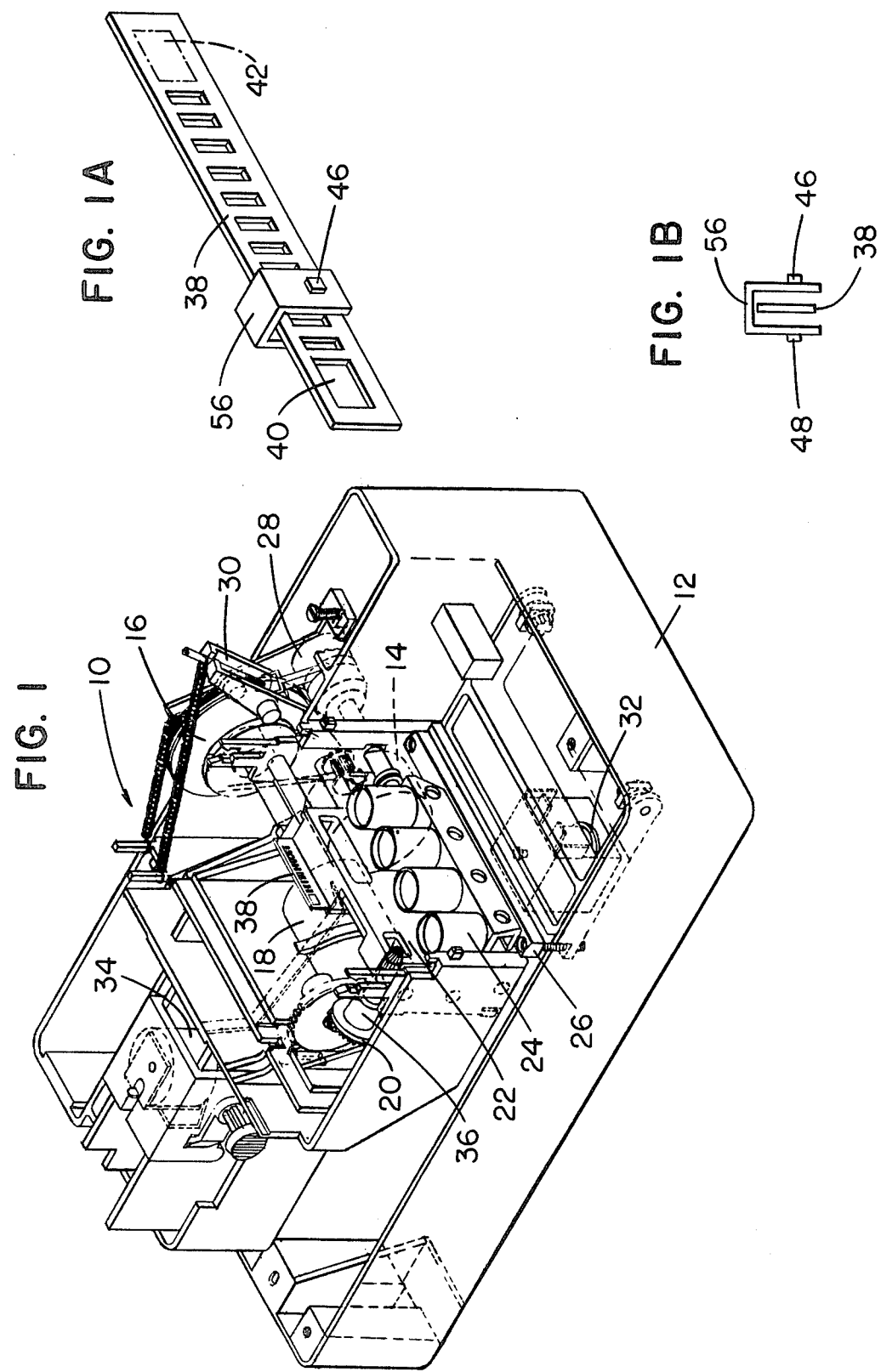
FIG. 1 is a left front perspective view of a matrix printer utilizing the subject matter of the present invention.

Referring now to FIG. 1 there is shown a printer of the matrix type generally designated as 10, the top cover or portion thereof being removed to illustrate certain of the interior working parts which are contained within an enclosure 12 which assumes a rectangular shape and provides mechanical protection for a compact high speed printer. Specifically, the printer is an alpha-numeric single printing element electronic recorder which utilizes a control system adaptable for a family of printers performing various functions. A drive motor 14 is positioned to drive a cluster of gears 16, a drum-type cam 18 and a bevel gear 20 for driving a ribbon in continuous manner past the printing station. The drum cam 18 is continuously driven by the motor 14 and provides side-to-side drive or movement for a print carriage 22 drivingly connected with a rail of the cam and which carries a plurality of printing elements 24 for printing in a dot matrix manner on printing paper or like form which is caused to be moved across a platen 26 which platen is in the shape of a flat bar disposed laterally across the printer. The printing elements 24, hereinafter described in the preferred embodiment of the present invention as single wire solenoid driven elements, are aligned in a row and are caused to be moved a distance of approximately 0.6 to 0.7 inch during the printing operation which includes printing in each direction of movement or travel of the printing carriage 22.

At the end of each line of printing, the paper is caused to be moved by an incremental dot feed arm 28 wherein in the case of a seven dot height matrix character, the feed arm will advance the paper in slow feed manner a total of seven times to complete the printing of a line of characters. A line feed arm 30 provides for advancing the printing paper at a line-to-line spacing which would advance the paper in a fast feed manner for the next line of characters. A forms compensation solenoid 32 and a slip or form stop solenoid 34 are provided for their respective functions although such solenoids and associated apparatus are not a part of the present invention. The bevel gear 20 is secured to one end of a drive shaft 36 for driving an ink ribbon in a cassette which is not shown, but which is normally attached across the front of the printing elements or solenoids 24 and to the frame of the printer so as to remain in one position as the solenoids are caused to be driven back and forth for printing operations by the drum cam 18. A timing strip 38 (see also FIGS. 1A and 1B) is secured to the carriage 22 to be moved back and forth across the printer and operates with a sensing device secured to the printer to provide delayed dot position signals for the printer control logic to actuate the print solenoids 24 at the proper dot column positions. A carriage home position (HOME 1) at the left end of the strip 38 is in the form of a window 40 and a home position (HOME 2) at the right end of the strip is in the form of a web area 42, such window and web areas being detected by sensing means to provide turn around of the carriage.

Figure 2:
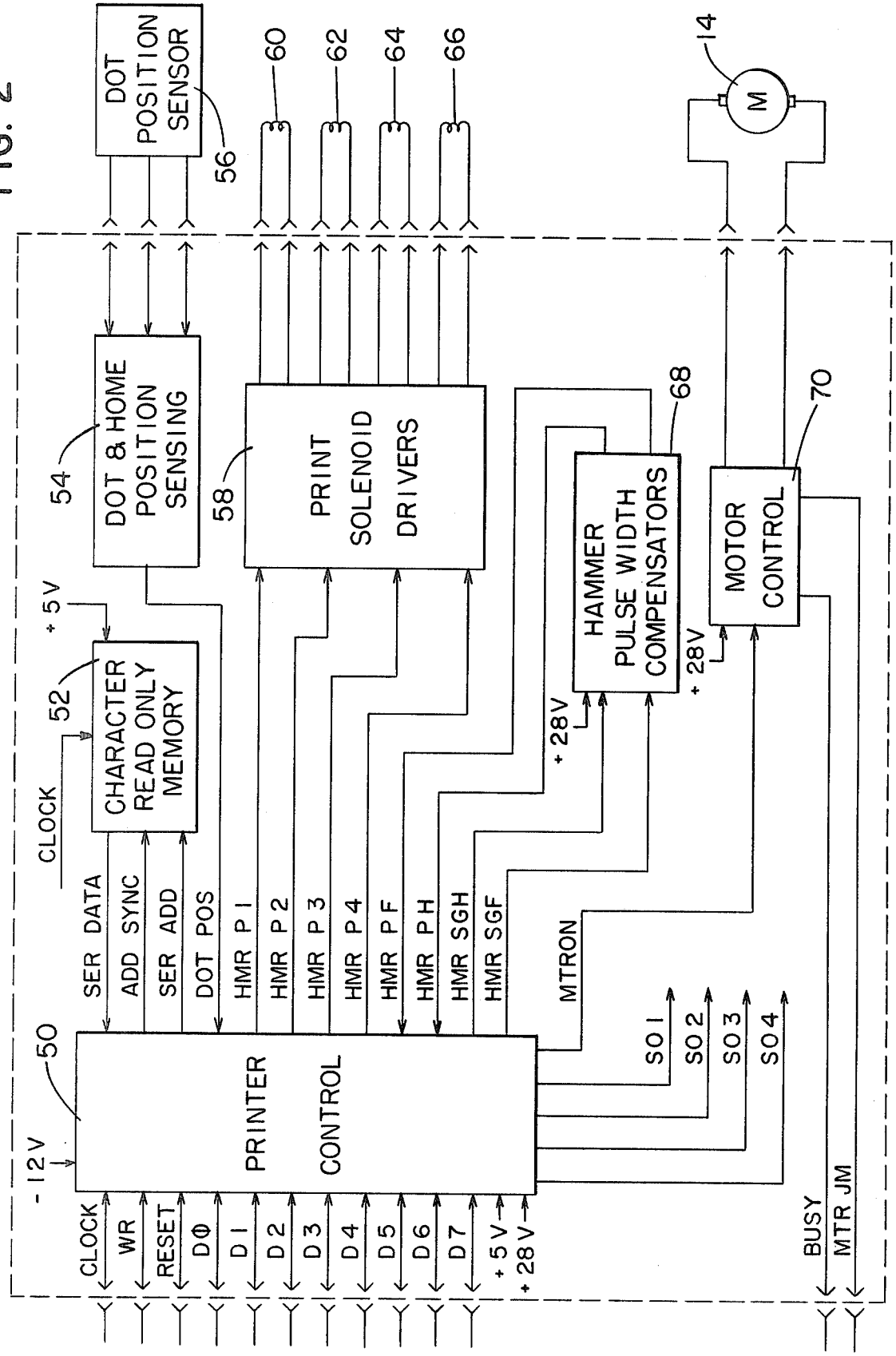
FIG. 2 is a block diagram of the control system of the present invention.

The printer in the present invention is of modular design for a preferred structure wherein 7 FONT is a character with 7 dots wide and 9 FONT is a character with 9 dots wide and is controlled by means of a printer control module or chip 50, as seen in FIG. 2, a character read-only memory module or chip 52, a dot and home position sensing circuit 54, and a dot position sensor 56. The sensor 56 includes a source of light 46 and a photocell 48 for detecting presence of the home positions and of the slots in the strip 38 (FIGS. 1A and 1B). The control module 50, the memory module 52 and the sensing circuit 54 are installed on a basic driver board attached to the printer frame. Additional circuitry includes a plurality of print solenoid drivers 58 for the print wire solenoid coils 60, 62, 64 and 66. The print solenoid drivers 58 are Darlington transistors having a fail-safe mechanism implemented therein in the form of a reset circuit to protect them from incorrect operation during power-up and power-down periods. A reset signal is connected to be high when the active level of voltage is reached (4.75–5.25 volts) and when a pair of transistors are activated, the line is pulled up to 5 volts and the print solenoids 24 are ready to be energized. During power-down, a low level reset signal is sent and the pair of transistors are cut off, so that the print solenoids will not be incorrectly triggered. The basic control diagram also includes hammer pulse width compensators 68 and a motor control circuit 70 for the motor 14. The hammer pulse width compensators on the basic driver board provide activation time for the print solenoids 24 to print full dots and half dots independently. Each compensator is basically a one shot timer with a standard pulse TW equal to 340 microseconds when triggered by the falling edge of the hammer signals (HMRSGF or HMRSGH). Representative of the type compensator 68 used in the invention is the unit produced by Signetics under part number NE 556. When $V_p$, the 28 volt power supply, deviates from the nominal voltage, the output pulsewidth (HMRPF or HMRPH) will be inversely adjusted to maintain an even print quality. An empirical relationship between $V_p$ (volts) and TW (microseconds) is established and expressed by the following equation—$TW = 10(28 - V_p) + 340$. 10 microseconds must be added to (or subtracted from) the hammer pulsewidth for each volt drop (or rise) on the 28 volt power line. The time constant of the compensator is designated at 2.8 milliseconds and the exponential nature of the RC network affects the actual compensator with a non-linear correction against changing power supply voltage. A 20 microsecond over-compensation is provided at the low end of $V_p$ (23.8 volts) and a 10 microsecond under-compensation at the high end of $V_p$ (31.0 volts). As a result, the maximum hammer pulsewidth errors, +3.6% to −5.5%, are introduced into the compensators. A clock, write (WR) and reset signal are input to the control module 50 along with D$\phi$–D7 which comprise the first to eighth bits of the input data. A busy signal and a motor jam (MTR JM) signal are connected to the motor control 70. The dot and home position sensing circuit 54 and the motor control circuit 70 are fully disclosed in a copending application and assigned to the same assignee as the present application, Ser. No. 869,890, filed Jan. 16, 1978.

Figure 3:
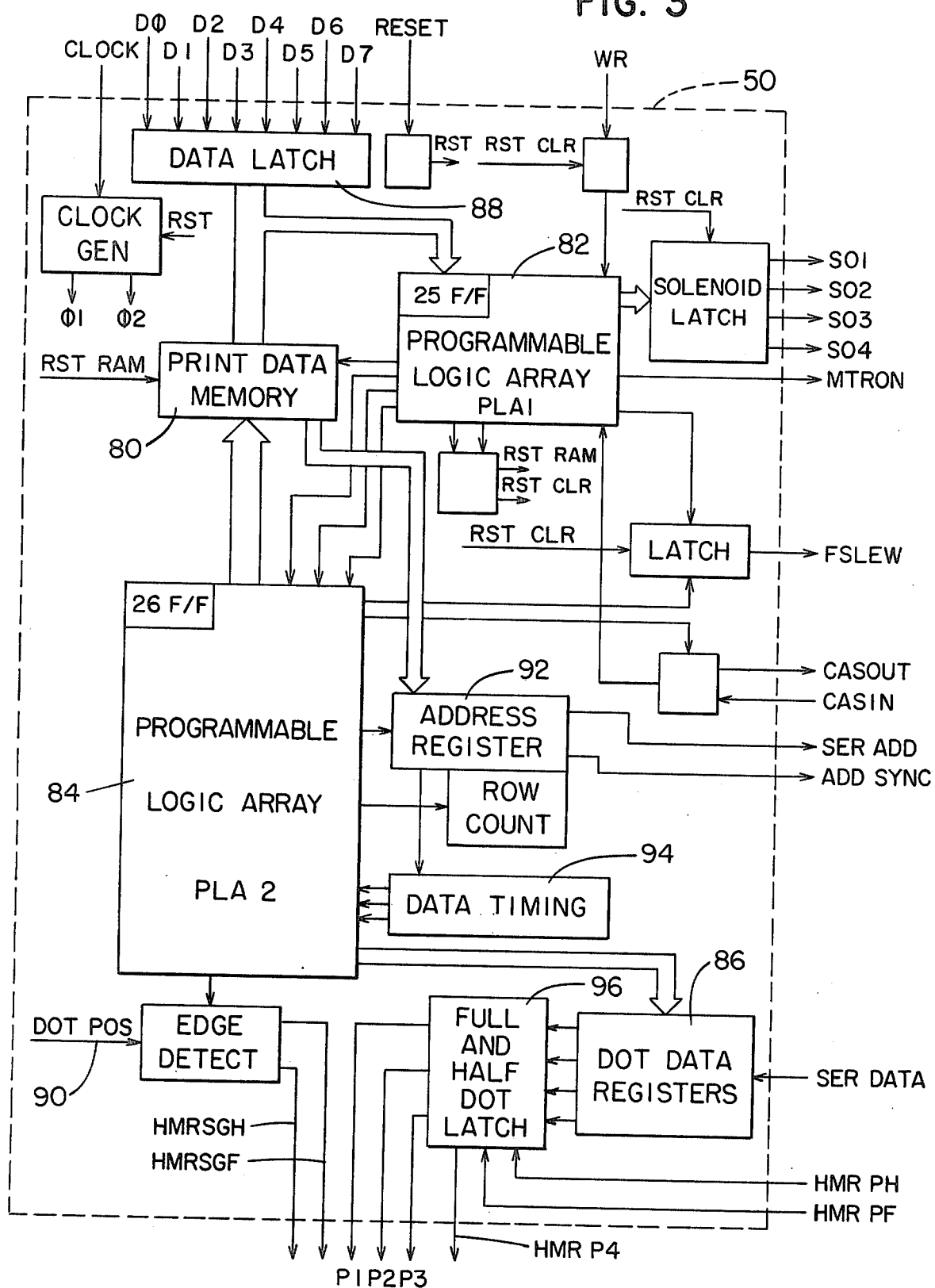
FIG. 3 is a block diagram of the printer controller.

In FIG. 3 is shown a block diagram of the printer control module 50 and including at least four main sections or areas which are the memory unit 80, a programmable logic unit (PLA1) 82, a programmable logic unit (PLA2) 84 and a plurality of dot data registers 86 for the print solenoids 24. The control module 50 has the two array units 82 and 84, the memory unit 80, and four 13 bit serial in/serial out registers 86 for operation from a single phase external clock arranged to provide storage for 40 print characters plus control and control options to implement bidirectional print control of the 40 column printer. Five control pins provide general purpose drivers and fast slew for the record paper. A parallel data code is strobed into a data latch 88 by a write signal (WR) and is then stored in the access memory 80 or RAM device. The control function data is decoded in the logic unit 82 (PLA1) and a double wide character funtion turns on an indicator bit and stores this bit into the memory 80 along with those data codes which are for the double width characters and each data code occupies two locations in memory. The start to print (PRT) function turns the motor on signal (MTRON) to a true state and the optical sensor 56 of the printer senses dot positions from a leading edge and a trailing edge of the slots in the timing strip. In this manner, the sensor 56 must sense three consecutive slots or six slot edges prior to entering into the home search mode; and then must sense two home positions prior to generation of any hammer signals. The leading edge of the dot position line 90 (DOTPOS) generates a hammer generation full signal (HMSRGF) and the trailing edge generates a hammer generation half signal (HMRSGH) with the dot position (DOTPOS) also identifying the two home positions, HOME 1 and HOME 2 at the ends of the strip by counting the number of times that the sensor 56 passes the home positions 40 and 42. DOTPOS is the dot position pulse which is generated by the dot position sensor 56, and DOT is the pulse generated by each edge of the dot position pulse. The position and the direction of travel of the print carriage 22 are determined by whether or not a dot pulse appears as a result of sensing either edge of a slot in the timing strip 38. If a dot pulse does not appear within a predetermined amount of time, it is known that the printer is in one or the other of the home positions. The HOME 1 position or the window area 40 of the timing strip is a logic false input, and the HOME 2 position which is the web area 42 of the timing strip is a logic true input.

The data code stored in the memory 80 is sent out at the second home position after the motor on output (MTRON) becomes true, and a pulse on the address synchronizing line (ADDSYNC) indicates the start of a fifteen bit serial address for the character read only memory 52. The first four bits of the code relate the row address, the next eight bits identify the character code, the thirteenth bit is for a double width character, and the fourteenth bit indicates the second part or portion of the double width character, with the fifteenth bit being reserved for a forward printing direction, that is, from left to right in the travel of the print carriage 22. CASIN is a printer control chip input (cascade) which blocks the print data to be loaded into the RAM 80 when the input is high. CASOUT is a control chip output (cascade). The character memory 52 returns a fourteen bit dot information on a serial data line (SER DATA) and loads this information into the dot data registers 86, the first bit being for a nine dot wide character, and the second bit indicating a last row of print line with the remaining bits being dots for one row of a character print. The serial address is sent out four times and the dot information is returned four times prior to printing out each row of dots in a character. The dot data registers 86 comprise four serial in/serial out types for the four print solenoids 24 with each register being 13 bits wide. As soon as all four 12 bits of dot data are clocked into the four registers, an additional bit position for all registers is clocked. The leading edge of the DOTPOS pulse clocks the dot into a latch 96 that is for full dot print and the trailing edge of the DOTPOS pulse clocks the dot into the latch 96 for half dot print. A 15 bit address register 92 receives a 4 bit row address, an 8 bit character code, a double wide indicator bit, a second part indicator bit and a forward direction bit which bits are parallel loaded prior to sending serially. The address synchronizing pulse is shifted through a data timing register 94 which pulse is synchronized with the serial address and the serial data. At a specified clock time, the register decodes the character font information and the end of line information from the 14 bit serial data.

As mentioned above, there are four dot data registers 86 for the four print solenoids with the hammer full generation signal (HMRSGF) and the hammer half generation signal (HMRSGH) being responsible for the hammer printing full and hammer printing half pulses, which pulses are generated outside the printer control module or chip 50. Each pulse makes the print solenoid fire in the presence of each dot latching in the full and half dot latch 96. The row address requires a count of seven times for the seven dot high characters, and of course, nine times for the nine dot high characters before a character line is completed and, at the end of the last count, the motor on output (MTRON) goes false.

For either fast or slow paper feed, the printer must receive the paper feed command and the number of paper feed data and the motor on output line (MTRON) is turned true when paper feed data is received and a seven bit binary number may be chosen to give from 1 to 127 dot row feeds on the slow paper feed, and from 1 to 127 line feeds for the fast paper feed option. The sensor 56 must detect six slot edges from the dot position pulse prior to entering the home search mode. A counter will time out the paper advance by counting the number of home positions sensed and at the end of the last count the motor on output is turned false.

Figure 4:
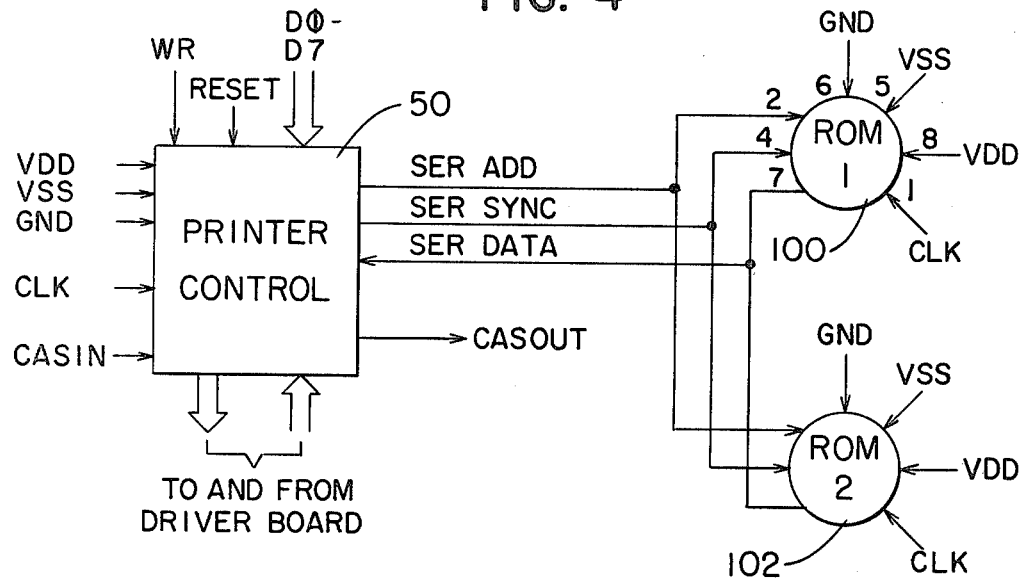
FIG. 4 is a block diagram of the printer controller and memory units for expansion of characters.

A block diagram of the printer control module 50 and memory units for expansion of characters is shown in FIG. 4 wherein a single printer control module is used with two read only memories 100 and 102, and connected by the serial address (SER ADD), the serial synchronizing (SER SYNC), and the serial data (SER DATA) lines. Typical pin out numbers are shown for the ROM 100.

Figure 5:
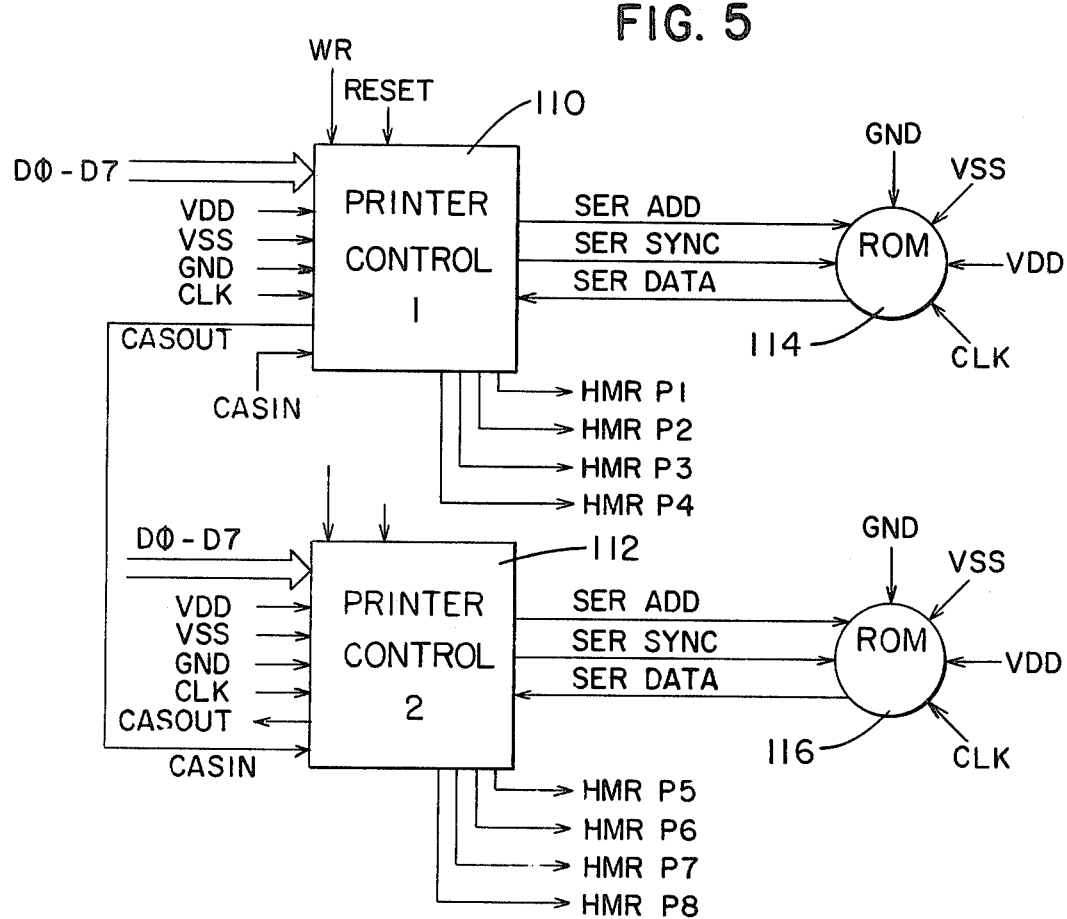
FIG. 5 is a block diagram of the printer controller and memory units for expansion of print columns.

A similar diagram of a pair of printer control modules 110 and 112 are shown in FIG. 5 for expansion of the print columns wherein each of the control modules are associated with a respective memory unit 114 and 116 in a one-to-one or singular manner.

Figure 6:
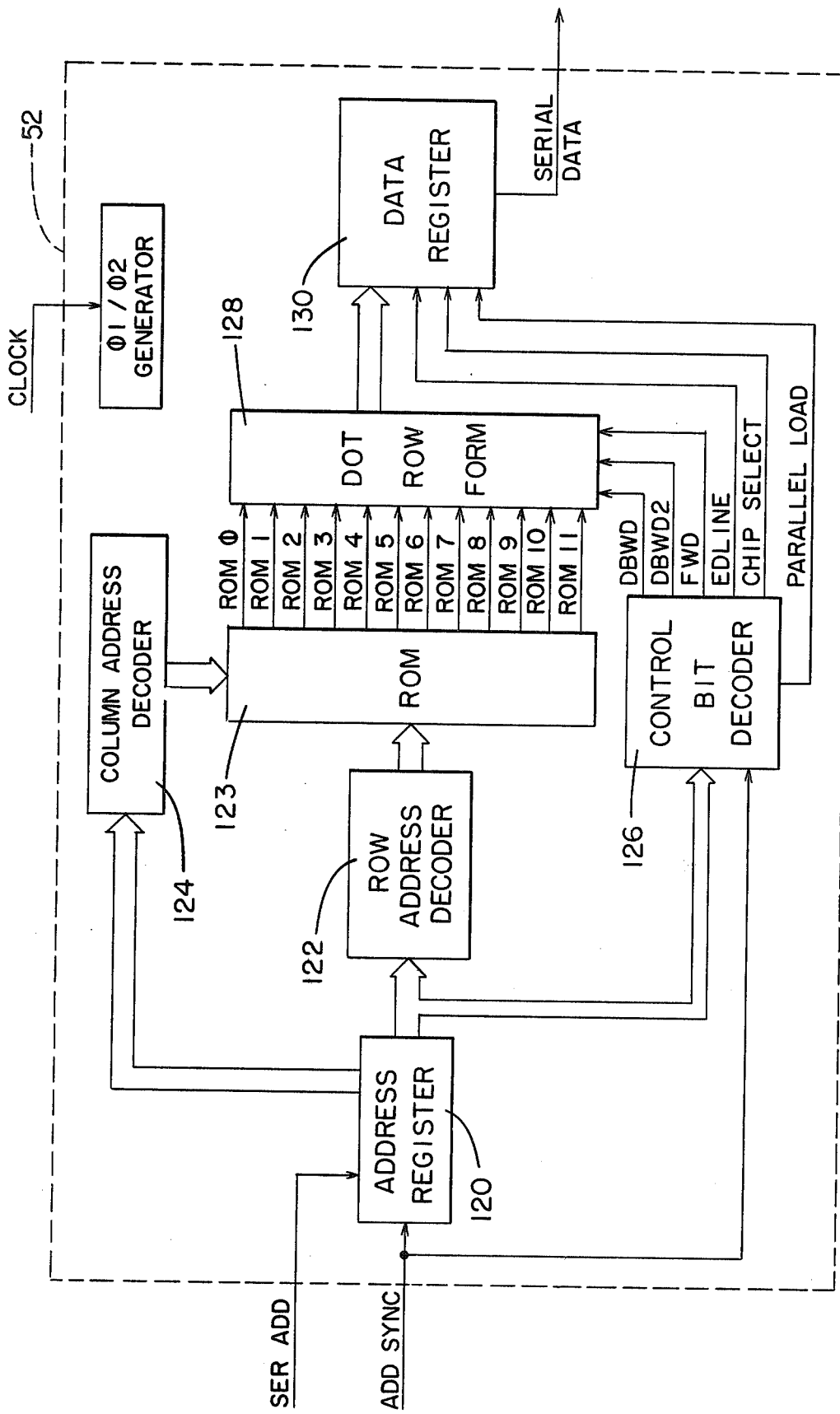
FIG. 6 is a block diagram of the character memory unit.
Figure 8A:
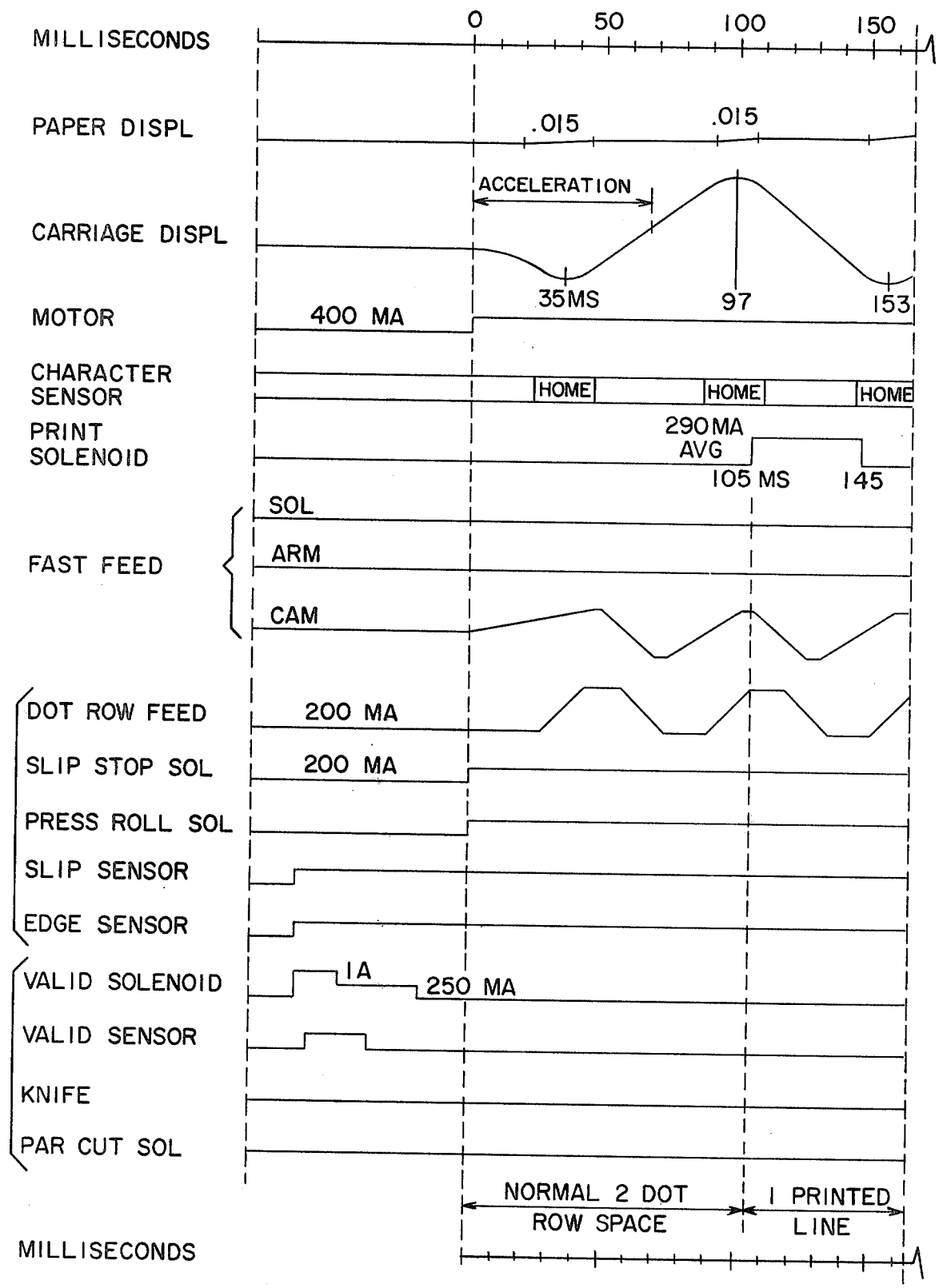
FIGS. 8A and 8B comprise a diagram of the printer timing.
Figure 8B:
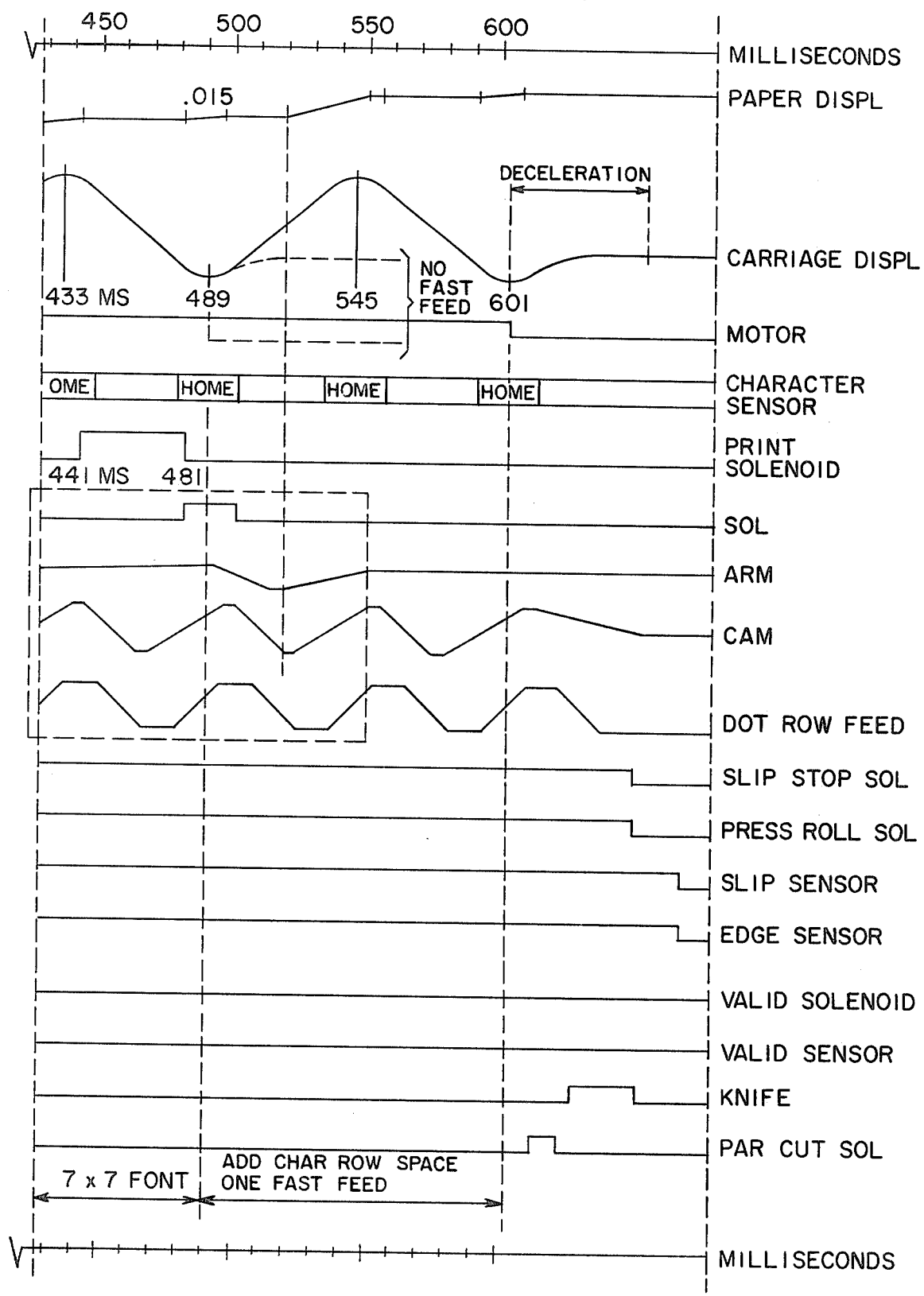
Figure 9:
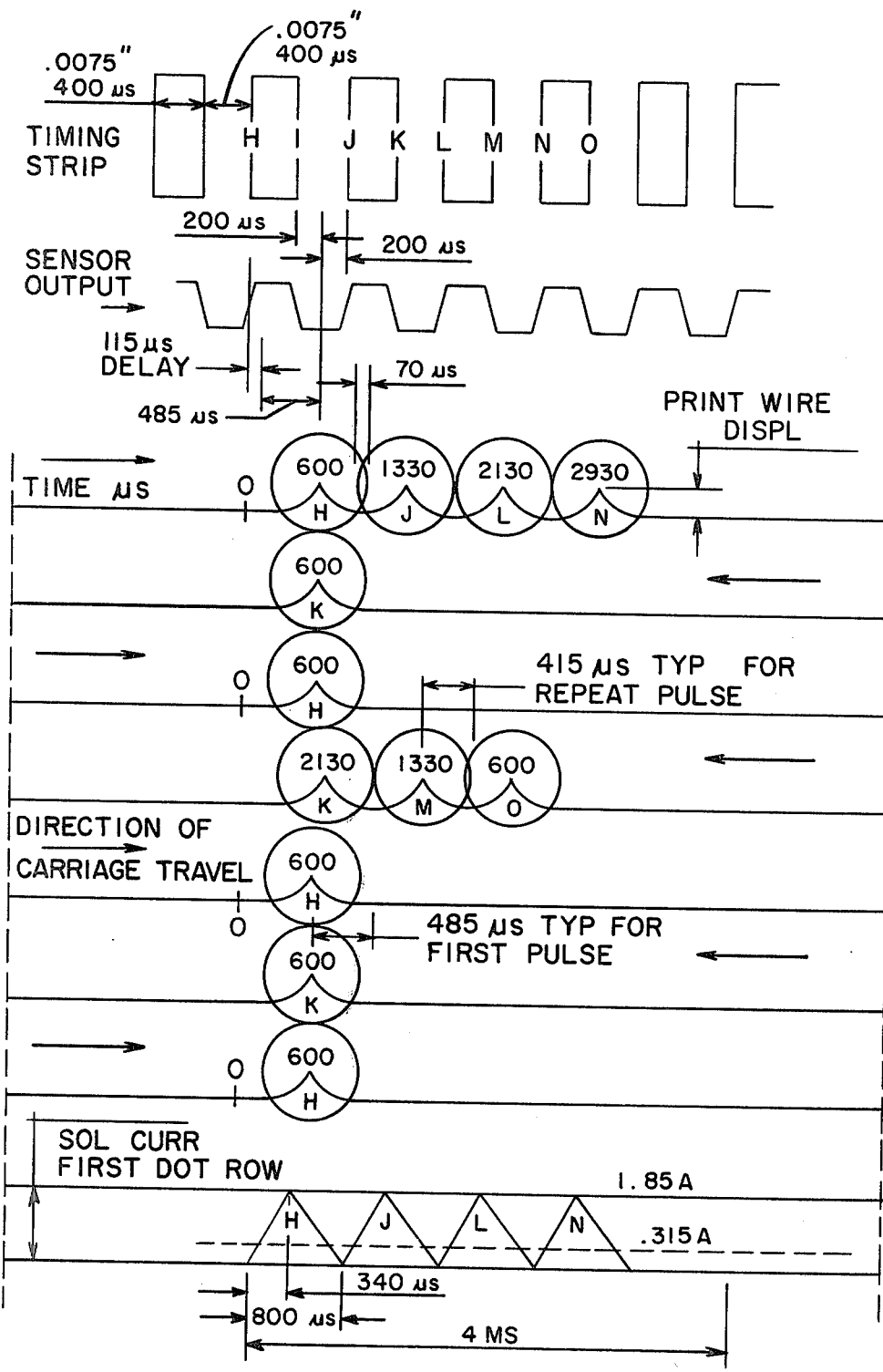
FIG. 9 is a diagram of the character dot timing.

In FIG. 6 is shown a block diagram of the character memory 52 which is a diffused mask programmable array consisting of 128 character locations in a twelve by ten matrix configuration. The characters can be programmed in N×M combinations where N is either 10 or 12 and M can be 5, 6, 7, 8, 9 or 10. The character

TABLE A-1-continued

PLA1 Control Section

| CONTROL SECTION | NAME OF F/F | TYPE OF F/F | INPUT COND. | RESET COND. |
|---|---|---|---|---|
| ENRCNT = | C1 . C$\phi$ . HMEPLES . PRT . $\overline{\text{EDLINE}}$ | | | |

The command control and decode section provides for an 8 bit data code being strobed with a write (WR) signal into the data latch with the function decoder operating on the following functions: start to print (PRT), extra dot rows per line (EDR), slow paper feed (SPF), fast paper feed (FPF), a double wide print (DBWD).

In the paper feed control, the function code for fast (line) paper feed control (FPFC) or for slow (dot row) paper feed control (SPFC) is given first followed by the number of lines or dot rows, with the MTRON line being activated or turned true immediately after this command. The paper feed counter will count the first to the seventh bit of the paper feed data (PFC$\phi$ to PFC6) according to the home position (HOME 1 or HOME 2) until the count reaches zero and the MTRON line goes false. PFC LOAD is the time period for loading the slow or fast paper feed.

The print sequence control provides that the start to print (PRT) function initiates the print cycle and any data that has been loaded into the print data memory or RAM 80 will be printed. C$\phi$ and C1 are the status bits for the print sequence control, CNT$\phi$, CNT1, and CNT2 are the status bits for the extra dot row feed control, and EXD$\phi$, EXD1, and EXD2 are the first, second and third bits of the extra dot row register. In addition to character dot rows, extra dot rows are also given. EDR LOAD is the time period for loading the extra dot row data.

The input timing control controls the print data into the RAM 80 with a double wide character being loaded with the same print data twice into the RAM, the TC$\phi$, TC1 and TC2 being the status bits for the data input timing chain. A double wide indicator bit is generated and is loaded into the RAM with the print data. If the character is single width, the data will be loaded only once into the RAM without the indicator bit.

The logic equations of PLA1 are as follows:

$T_{TC\phi}$ = $\overline{\text{TC2}}$ . TC1 . $\overline{\text{TC}\phi}$ . DBWD + $\overline{\text{TC2}}$ . TC1 . TC$\phi$ $T_{TC1}$ = TC2 . $\overline{\text{TC1}}$ . $\overline{\text{TC}\phi}$ + TC1 + TC2 . TC$\phi$ $T_{TC2}$ = $\overline{\text{RAMFULL}}$ . DATA . $\overline{\text{SPF}}$ . $\overline{\text{FPF}}$ . $\overline{\text{EDR}}$ . DECODE + TC2 + $\overline{\text{TC2}}$ . TC1 . $\overline{\text{TC}\phi}$ . DBWD CLR = DATA . $\overline{\text{SPF}}$ . $\overline{\text{FPF}}$ . $\overline{\text{EDR}}$ . DECODE . $\overline{\text{D3}}$ . $\overline{\text{D2}}$ . $\overline{\text{D1}}$ . $\overline{\text{D}\phi}$ CLRALL = DATA . $\overline{\text{SPF}}$ . $\overline{\text{FPF}}$ . $\overline{\text{EDR}}$ . DECODE . $\overline{\text{D3}}$ . $\overline{\text{D2}}$ . $\overline{\text{D1}}$ . $\overline{\text{D}\phi}$ + C1 . C$\phi$ . HMEPLS . EDLINE . MATCH . PRT + C1 . $\overline{\text{C}\phi}$ . HMEPLS . MATCH . PRT + HMEPLS . FPFC . $\overline{\text{PFC6}}$ . $\overline{\text{PFC5}}$ . $\overline{\text{PFC4}}$ . $\overline{\text{PFC3}}$ . $\overline{\text{PFC2}}$ . $\overline{\text{PFC1}}$ . $\overline{\text{PFC}\phi}$ + HMEPLS . SPFC . $\overline{\text{PFC6}}$ . $\overline{\text{PFC5}}$ . $\overline{\text{PFC4}}$ . $\overline{\text{PFC3}}$ . $\overline{\text{PFC2}}$ . $\overline{\text{PFC1}}$ . $\overline{\text{PFC}\phi}$ CLRCCDC = DATA . $\overline{\text{SPF}}$ . $\overline{\text{FPF}}$ . $\overline{\text{EDR}}$ . DECODE . $\overline{\text{D}_3}$ . $\overline{\text{D2}}$ . $\overline{\text{D1}}$ . $\overline{\text{D}\phi}$ + C1 . C$\phi$ . HMEPLS . EDLINE . MATCH . PRT + C1 . $\overline{\text{C}\phi}$ . HMEPLS . MATCH . PRT + HMEPLS . FPFC . $\overline{\text{PFC6}}$ . $\overline{\text{PFC5}}$ . $\overline{\text{PFC4}}$ . $\overline{\text{PFC3}}$ . $\overline{\text{PFC2}}$ . $\overline{\text{PFC1}}$ . $\overline{\text{PFC}\phi}$ + HMEPLS . SPFC . $\overline{\text{PFC6}}$ . $\overline{\text{PFC5}}$ . $\overline{\text{PFC4}}$ . $\overline{\text{PFC3}}$ . $\overline{\text{PFC2}}$ . $\overline{\text{PFC1}}$ . $\overline{\text{PFC}\phi}$ + RSTTIMER $T_{PRT}$ = $\overline{\text{MTRON}}$ . $\overline{\text{DATA}}$ . $\overline{\text{SPF}}$ . $\overline{\text{FPF}}$ . $\overline{\text{EDR}}$ . DECODE . $\overline{\text{D3}}$ . D2 . D1 . D$\phi$ . $\overline{\text{PRT}}$ + C1 . C$\phi$ . HMEPLS . EDLINE . MATCH . PRT + C1 . $\overline{\text{C}\phi}$ . HMEPLS . MATCH . PRT $T_{EDR}$ = $\overline{\text{MTRON}}$ . $\overline{\text{DATA}}$ . $\overline{\text{SPF}}$ . $\overline{\text{FPF}}$ . $\overline{\text{EDR}}$ . DECODE . $\overline{\text{D3}}$ . D2 . D1 . $\overline{\text{D}\phi}$ + DECODE . EDR $T_{SPF}$ = $\overline{\text{MTRON}}$ . $\overline{\text{DATA}}$ . $\overline{\text{SPF}}$ . $\overline{\text{FPF}}$ . $\overline{\text{EDR}}$ . DECODE . $\overline{\text{D3}}$ . D2 . $\overline{\text{D1}}$ . D$\phi$ + DECODE . SPF $T_{FPF}$ = $\overline{\text{MTRON}}$ . $\overline{\text{DATA}}$ . $\overline{\text{SPF}}$ . $\overline{\text{FPF}}$ . $\overline{\text{EDR}}$ . DECODE $\overline{\text{D3}}$ . D2 . $\overline{\text{D1}}$ . $\overline{\text{D}\phi}$ + DECODE . FPF $T_{DEWD}$ = $\overline{\text{MTRON}}$ . $\overline{\text{DATA}}$ . $\overline{\text{SPF}}$ . $\overline{\text{FPF}}$ . $\overline{\text{EDR}}$ . DECODE . $\overline{\text{D3}}$ . $\overline{\text{D2}}$ . D1 . $\overline{\text{D}\phi}$ . $\overline{\text{DEWD}}$ + $\overline{\text{MTRON}}$ . $\overline{\text{DATA}}$ . $\overline{\text{SPF}}$ . $\overline{\text{FPF}}$ . $\overline{\text{EDR}}$ . DECODE . $\overline{\text{D3}}$ . $\overline{\text{D2}}$ . D1 . D$\phi$ . DEWD -continued $SS01 = \overline{DATA} \cdot \overline{SPF} \cdot \overline{FPF} \cdot \overline{EDR} \cdot DECODE \cdot D3 \cdot \overline{D2} \cdot \overline{D1} \cdot \overline{D\phi} \cdot \overline{MTRON}$ $SS02 = \overline{DATA} \cdot \overline{SPF} \cdot \overline{FPF} \cdot \overline{EDR} \cdot DECODE \cdot D3 \cdot \overline{D2} \cdot \overline{D1} \cdot D\phi \cdot \overline{MTRON}$ $SS03 = \overline{DATA} \cdot \overline{SPF} \cdot \overline{FPF} \cdot \overline{EDR} \cdot DECODE \cdot D3 \cdot \overline{D2} \cdot D1 \cdot \overline{D\phi} \cdot \overline{MTRON}$ $SS04 = \overline{DATA} \cdot \overline{SPF} \cdot \overline{FPF} \cdot \overline{EDR} \cdot DECODE \cdot D3 \cdot \overline{D2} \cdot D1 \cdot D\phi \cdot \overline{MTRON}$ $SFSLEW = HMEPLS \cdot FPFC \cdot \overline{PFC6} \cdot \overline{PFC5} \cdot \overline{PFC4} \cdot \overline{PFC3} \cdot \overline{PFC2} \cdot \overline{PFC1} \cdot \overline{PFC\phi}$ $RS01234 = \overline{DATA} \cdot \overline{SPF} \cdot \overline{FPF} \cdot \overline{EDR} \cdot DECODE \cdot \overline{D3} \cdot \overline{D2} \cdot \overline{D1} \cdot D\phi$ $T_{FPFC} = DECODE \cdot FPF \cdot \overline{FPFC} + HMEPLS \cdot FPFC \cdot \overline{PFC6} \cdot \overline{PFC5} \cdot \overline{PFC4} \cdot \overline{PFC3} \cdot \overline{PFC2} \cdot \overline{PFC1} \cdot \overline{PFC\phi}$ $T_{SPFC} = DECODE \cdot \overline{SPFC} \cdot SPF + HMEPLS \cdot SPFC \cdot \overline{PFC6} \cdot \overline{PFC5} \cdot \overline{PFC4} \cdot \overline{PFC3} \cdot \overline{PFC2} \cdot \overline{PFC1} \cdot \overline{PFC\phi}$

MTRON = PRT + SPFC + FPFC
PFC LOAD = FPF · DECODE + SPF · DECODE $T_{PFC\phi} = HMEPLS \cdot MTRON \cdot \overline{PRT}$ $T_{PFC1} = HMEPLS \cdot MTRON \cdot \overline{PRT} \cdot \overline{PFC\phi}$ $T_{PFC2} = HMEPLS \cdot MTRON \cdot \overline{PRT} \cdot \overline{PFC1} \cdot \overline{PFC\phi}$ $T_{PFC3} = HMEPLS \cdot MTRON \cdot \overline{PRT} \cdot \overline{PFC2} \cdot \overline{PFC1} \cdot \overline{PFC\phi}$ $T_{PFC4} = HMEPLS \cdot MTRON \cdot \overline{PRT} \cdot \overline{PFC3} \cdot \overline{PFC2} \cdot \overline{PFC1} \cdot \overline{PFC\phi}$ $T_{PFC5} = HMEPLS \cdot MTRON \cdot \overline{PRT} \cdot \overline{PFC4} \cdot \overline{PFC3} \cdot \overline{PFC2} \cdot \overline{PFC1} \cdot \overline{PFC\phi}$ $T_{PFC6} = HMEPLS \cdot MTRON \cdot \overline{PRT} \cdot \overline{PFC5} \cdot \overline{PFC4} \cdot \overline{PFC3} \cdot \overline{PFC2} \cdot \overline{PFC1} \cdot \overline{PFC\phi}$ $T_{C\phi} = \overline{C1} \cdot \overline{C\phi} \cdot HMEPLS \cdot PTR + C1 \cdot C\phi \cdot HMEPLS \cdot EDLINE \cdot \overline{MATCH} \cdot PRT + C1 \cdot C\phi \cdot HMEPLS \cdot EDLINE \cdot MATCH \cdot PRT$ $T_{C1} = \overline{C1} \cdot C\phi \cdot HMEPLS \cdot PRT + C1 \cdot C\phi \cdot HMEPLS \cdot EDLINE \cdot MATCH \cdot PRT + C1 \cdot \overline{C\phi} \cdot HMEPLS \cdot MATCH \cdot PRT$ $T_{CNT\phi} = C1 \cdot C\phi \cdot HMEPLS \cdot EDLINE \cdot \overline{MATCH} \cdot PRT + C1 \cdot \overline{C\phi} \cdot HMEPLS \cdot \overline{MATCH} \cdot PRT$ $T_{CNT1} = C1 \cdot \overline{C\phi} \cdot HMEPLS \cdot \overline{MATCH} \cdot PRT \cdot CNT\phi$ $T_{CNT2} = C1 \cdot \overline{C\phi} \cdot HMEPLS \cdot \overline{MATCH} \cdot PRT \cdot CNT1 \cdot CNT\phi$

EDRLOAD = EDR · DATA · DECODE $MATCH = EXD2 \cdot \overline{CNT2} + \overline{EXD2} \cdot CNT2 + EXD1 \cdot \overline{CNT1} + \overline{EXD1} \cdot CNT1 + EXD\phi \cdot \overline{CNT\phi} + \overline{EXD\phi} \cdot CNT\phi$

ACTPRT = C1 · Cφ

PRTHME = $C1 \cdot C\phi \cdot HMEPLS \cdot PRT \cdot \overline{EDLINE} + \overline{C1} \cdot C\phi \cdot HMEPLS \cdot PRT$ ENRCNT = $C1 \cdot C\phi \cdot HMEPLS \cdot PRT \cdot \overline{EDLINE}$ PLA2 is activated by 26 flip flops and has four logic control sections which are home detect and control, RAM address control and refresh, direction, and ROM access control. The names and types of the flip flops and the input and reset conditions are shown in Table A-2. In this Table, HDφ, HD1 and HD2 indicate the first to third status bits of the home detect control, CCφ-CC3 are the first to fourth bits of the character counter, and DCφ-DC3 are the status bits of the dot counter. Fφ-F4 indicate the first to fifth bits of the refresh counter which are addresses during refreshing of the RAM 80. LCφ-LC3 indicate the first to fourth bits of the RAM address with HCφ and HC1 being the fifth and sixth bits of the RAM address. In the direction ROM access control section FWD indicates the carriage forward direction ACCROM is the time period for the character ROM 52 access, RAMFULL indicates that the RAM 80 is filled with print data, and SCOMPT or CHECK is a signal which indicates that a train of dot data is received by the printer control unit after each character ROM access. ENRCNT is incrementing the row counter at each HOME position during printing. SS01-SS04 are resettable flip-flops.

position after the second bit of the serial data line is encoded true. This bit indicates that this is the last row of the print line. If the extra dot rows per line function (EDR) has not been set to zero, the motor on output will stay true until extra home positions are reached and the number of the extra home positions matches the number in the extra dot row register. Then the motor on output is turned off.

the control function codes also apply to solenoids 1, 2, 3, and 4 wherein the functions can turn the outputs SO1 through SO4 to true states in individual manner. The outputs will stay in true states until the clear printer function (CLR) or the deactivate all solenoids function (DAS) is received. The reset input can also turn the outputs to an off condition. The particular function of these solenoids are to activate a form, to provide for full paper cut, for partial paper cut or for an active spare which may be utilized for a further function.

Referring back to FIG. 3 which shows the programmable logic array units 82 and 84, PLA1 is activated by 25 flip flops. The unit 82 consists of four logic control functions which are command control and decode, paper feed control, print sequence control and input timing control. The names and types of the flip flops and their input and reset conditions are shown in Table A-1.

TABLE A-1

PLA1 Control Section

| CONTROL SECTION | NAME OF F/F | TYPE OF F/F | INPUT COND. | RESET COND. |
|---|---|---|---|---|
| Command | PRT | T | $T_{PRT}$ | RSTALL |
| Control | EDR | T | $T_{EDR}$ | RSTALL |
| and | SPF | T | $T_{SPF}$ | RSTALL |
| Decode | FPF | T | $T_{FPF}$ | RSTALL |
|  | DBWD | T | $T_{DBWD}$ | RSTALL |
| Paper | FPFC | T | $T_{FP\,RSTALL}$ |  |
| Feed | SPFC | T | $T_{SPFC}$ | RSTALL |
| Control | PFC6 | T/D | $T_{PFC6}$ + PFCLOAD D6 | RSTALL |
|  | PFC5 | T/D | $T_{PFC5}$ + PFCLOAD D5 | RSTALL |
|  | PFC4 | T/D | $T_{PFC4}$ + PFCLOAD D4 | RSTALL |
|  | PFC3 | T/D | $T_{PFC3}$ + PFCLOAD D3 | RSTALL |
|  | PFC2 | T/D | $T_{PFC2}$ + PFCLOAD D2 | RSTALL |
|  | PFC1 | T/D | $T_{PFC1}$ + PFCLOAD D1 | RSTALL |
|  | PFC$\phi$ | T/D | $T_{PFC\phi}$ + PFCLOAD D$\phi$ | RSTALL |
| Print | C1 | T | $T_{C1}$ | RSTALL |
| Sequence | C$\phi$ | T | $T_{C\phi}$ | RSTALL |
| Control | CNT2 | T | $T_{CNT2}$ | RSTALL |
|  | CNT1 | T | $T_{CNT1}$ | RSTALL |
|  | CNT$\phi$ | T | $T_{CNT\phi}$ | RSTALL |
|  | EXD2 | D | EDRLOAD D2 | RST |
|  | EXD1 | D | EDRLOAD D1 | RST |
|  | EXD$\phi$ | D | EDRLOAD D$\phi$ | RST |
| Input | TC2 | T | $T_{TC2}$ | RSTALL |
| Timing | TC1 | T | $T_{TC1}$ | RSTALL |
| Control | TC$\phi$ | T | $T_{TC\phi}$ | RSTALL |

The logic equations of PLA1 are as follows:

$$T_{TC\phi} = \overline{TC2} \cdot TC1 \cdot \overline{TC\phi} \cdot DBWD + \overline{TC2} \cdot TC1 \cdot TC\phi$$

$$T_{TC1} = TC2 \cdot \overline{TC1} \cdot \overline{TC\phi} + TC1 + TC2 \cdot TC\phi$$

$$T_{TC2} = \overline{RAMFULL} \cdot DATA \cdot \overline{SPF} \cdot \overline{FPF} \cdot \overline{EDR} \cdot DECODE + TC2 + \overline{TC2} \cdot TC1 \cdot \overline{TC\phi} \cdot DBWD$$

$$CLR = \overline{DATA} \cdot \overline{SPF} \cdot \overline{FPF} \cdot \overline{EDR} \cdot DECODE \cdot \overline{D3} \cdot \overline{D2} \cdot \overline{D1} \cdot \overline{D\phi}$$

$$CLRALL = \overline{DATA} \cdot \overline{SPF} \cdot \overline{FPF} \cdot \overline{EDR} \cdot DECODE \cdot \overline{D3} \cdot \overline{D2} \cdot \overline{D1} \cdot D\phi$$
$$+ C1 \cdot C\phi \cdot HMEPLS \cdot EDLINE \cdot MATCH \cdot PRT + C1 \cdot \overline{C\phi} \cdot$$
$$HMEPLS \cdot MATCH \cdot PRT + HMEPLS \cdot FPFC \cdot \overline{PFC6} \cdot \overline{PFC5} \cdot$$
$$\overline{PFC4} \cdot \overline{PFC3} \cdot \overline{PFC2} \cdot \overline{PFC1} \cdot \overline{PFC\phi} + HMEPLS \cdot SPFC \cdot$$
$$\overline{PFC6} \cdot \overline{PFC5} \cdot \overline{PFC4} \cdot \overline{PFC3} \cdot \overline{PFC2} \cdot \overline{PFC1} \cdot \overline{PFC\phi}$$

$$CLRCCDC = \overline{DATA} \cdot \overline{SPF} \cdot \overline{FPF} \cdot \overline{EDR} \cdot DECODE \cdot \overline{D3} \cdot \overline{D2} \cdot \overline{D1} \cdot D\phi$$
$$+ C1 \cdot C\phi \cdot HMEPLS \cdot EDLINE \cdot MATCH \cdot PRT + C1 \cdot \overline{C\phi} \cdot$$
$$HMEPLS \cdot MATCH \cdot PRT + HMEPLS \cdot FPFC \cdot \overline{PFC6} \cdot \overline{PFC5} \cdot$$
$$\overline{PFC4} \cdot \overline{PFC3} \cdot \overline{PFC2} \cdot \overline{PFC1} \cdot \overline{PFC\phi} + HMEPLS \cdot SPFC \cdot$$
$$\overline{PFC6} \cdot \overline{PFC5} \cdot \overline{PFC4} \cdot \overline{PFC3} \cdot \overline{PFC2} \cdot \overline{PFC1} \cdot \overline{PFC\phi} +$$
$$RSTTIMER$$

$$T_{PRT} = \overline{MTRON} \cdot DATA \cdot \overline{SPF} \cdot \overline{FPF} \cdot \overline{EDR} \cdot DECODE \cdot \overline{D3} \cdot D2 \cdot D1 \cdot$$
$$D\phi \cdot \overline{PRT} + C1 \cdot C\phi \cdot HMEPLS \cdot EDLINE \cdot MATCH \cdot PRT + C1 \cdot$$
$$\overline{C\phi} \cdot HMEPLS \cdot MATCH \cdot PRT$$

TABLE A-1-continued

PLA1 Control Section

| CONTROL SECTION | NAME OF F/F | TYPE OF F/F | INPUT COND. | RESET COND. |
|---|---|---|---|---|

$T_{EDR}$ = $\overline{MTRON} \cdot \overline{DATA} \cdot \overline{SPF} \cdot \overline{FPF} \cdot \overline{EDR} \cdot DECODE \cdot \overline{D3} \cdot D2 \cdot D1 \cdot \overline{D\phi}$ + DECODE $\cdot$ EDR $T_{SPF}$ = $\overline{MTRON} \cdot \overline{DATA} \cdot \overline{SPF} \cdot \overline{FPF} \cdot \overline{EDR} \cdot DECODE \cdot \overline{D3} \cdot D2 \cdot \overline{D1} \cdot D\phi$ + DECODE $\cdot$ SPF $T_{FPF}$ = $\overline{MTRON} \cdot \overline{DATA} \cdot \overline{SPF} \cdot \overline{FPF} \cdot \overline{EDR} \cdot DECODE \cdot \overline{D3} \cdot D2 \cdot \overline{D1} \cdot \overline{D\phi}$ + DECODE $\cdot$ FPF $T_{DBWD}$ = $\overline{MTRON} \cdot \overline{DATA} \cdot \overline{SPF} \cdot \overline{FPF} \cdot \overline{EDR} \cdot DECODE \cdot \overline{D3} \cdot \overline{D2} \cdot D1 \cdot \overline{D\phi} \cdot \overline{DBWD}$ + $\overline{MTRON} \cdot \overline{DATA} \cdot \overline{SPF} \cdot \overline{FPF} \cdot \overline{EDR} \cdot DECODE \cdot \overline{D3} \cdot \overline{D2} \cdot D1 \cdot D\phi \cdot DBWD$ SS01 = $\overline{DATA} \cdot \overline{SPF} \cdot \overline{FPF} \cdot \overline{EDR} \cdot DECODE \cdot D3 \cdot \overline{D2} \cdot \overline{D1} \cdot \overline{D\phi} \cdot \overline{MTRON}$ SS02 = $\overline{DATA} \cdot \overline{SPF} \cdot \overline{FPF} \cdot \overline{EDR} \cdot DECODE \cdot D3 \cdot \overline{D2} \cdot \overline{D1} \cdot D\phi \cdot \overline{MTRON}$ SS03 = $\overline{DATA} \cdot \overline{SPF} \cdot \overline{FPF} \cdot \overline{EDR} \cdot DECODE \cdot D3 \cdot \overline{D2} \cdot D1 \cdot \overline{D\phi} \cdot \overline{MTRON}$ SS04 = $\overline{DATA} \cdot \overline{SPF} \cdot \overline{FPF} \cdot \overline{EDR} \cdot DECODE \cdot D3 \cdot \overline{D2} \cdot D1 \cdot D\phi \cdot \overline{MTRON}$ SFSLEW = HMEPLS $\cdot$ FPFC $\cdot \overline{PFC6} \cdot \overline{PFC5} \cdot \overline{PFC4} \cdot \overline{PFC3} \cdot \overline{PFC2} \cdot \overline{PFC1} \cdot \overline{PFC\phi}$ RS$\phi$1234 = $\overline{DATA} \cdot \overline{SPF} \cdot \overline{FPF} \cdot \overline{EDR} \cdot DECODE \cdot \overline{D3} \cdot \overline{D2} \cdot \overline{D1} \cdot D\phi$ $T_{FPFC}$ = DECODE $\cdot$ FPF $\cdot \overline{FPFC}$ + HMEPLS $\cdot$ FPFC $\cdot \overline{PFC6} \cdot \overline{PFC5} \cdot \overline{PFC4} \cdot \overline{PFC3} \cdot \overline{PFC2} \cdot \overline{PFC1} \cdot \overline{PFC\phi}$ $T_{SPFC}$ = DECODE $\cdot \overline{SPFC} \cdot$ SPF + HMEPLS $\cdot$ SPFC $\cdot \overline{PFC6} \cdot \overline{PFC5} \cdot \overline{PFC4} \cdot \overline{PFC3} \cdot \overline{PFC2} \cdot \overline{PFC1} \cdot \overline{PFC\phi}$

MTRON = PRT + SPFC + FPFC

PFC LOAD = FPF $\cdot$ DECODE + SPF $\cdot$ DECODE $T_{PFC\phi}$ = HMEPLS $\cdot$ MTRON $\cdot \overline{PRT}$ $T_{PFC1}$ = HMEPLS $\cdot$ MTRON $\cdot \overline{PRT} \cdot \overline{PFC\phi}$ $T_{PFC2}$ = HMEPLS $\cdot$ MTRON $\cdot \overline{PRT} \cdot \overline{PFC1} \cdot \overline{PFC\phi}$ $T_{PFC3}$ = HMEPLS $\cdot$ MTRON $\cdot \overline{PRT} \cdot \overline{PFC2} \cdot \overline{PFC1} \cdot \overline{PFC\phi}$ $T_{PFC4}$ = HMEPLS $\cdot$ MTRON $\cdot \overline{PRT} \cdot \overline{PFC3} \cdot \overline{PFC2} \cdot \overline{PFC1} \cdot \overline{PFC\phi}$ $T_{PFC5}$ = HMEPLS $\cdot$ MTRON $\cdot \overline{PRT} \cdot \overline{PFC4} \cdot \overline{PFC3} \cdot \overline{PFC2} \cdot \overline{PFC1} \cdot \overline{PFC\phi}$ $T_{PFC6}$ = HMEPLS $\cdot$ MTRON $\cdot \overline{PRT} \cdot \overline{PFC5} \cdot \overline{PFC4} \cdot \overline{PFC3} \cdot \overline{PFC2} \cdot \overline{PFC1} \cdot \overline{PFC\phi}$ $T_{C\phi}$ = $\overline{C1} \cdot \overline{C\phi} \cdot$ HMEPLS $\cdot$ PRT + C1 $\cdot$ C$\phi \cdot$ HMPLES $\cdot$ EDLINE $\cdot \overline{MATCH} \cdot$ PRT + C1 $\cdot$ C$\phi \cdot$ HMEPLS $\cdot$ EDLINE $\cdot$ MATCH $\cdot$ PRT $T_{C1}$ = $\overline{C1} \cdot$ C$\phi \cdot$ HMEPLS $\cdot$ PRT + C1 $\cdot$ C$\phi \cdot$ HMEPLS $\cdot$ EDLINE $\cdot$ MATCH $\cdot$ PRT + C1 $\cdot \overline{C\phi} \cdot$ HMEPLS $\cdot$ MATCH $\cdot$ PRT $T_{CNT\phi}$ = C1 $\cdot$ C$\phi \cdot$ HMEPLS $\cdot$ EDLINE $\cdot \overline{MATCH} \cdot$ PRT + C1 $\cdot \overline{C\phi} \cdot$ HMEPLS $\cdot \overline{MATCH} \cdot$ PRT $T_{CNT1}$ = C1 $\cdot \overline{C\phi} \cdot$ HMEPLS $\cdot \overline{MATCH} \cdot$ PRT $\cdot$ CNT$\phi$ $T_{CNT2}$ = C1 $\cdot \overline{C\phi} \cdot$ HMEPLS $\cdot \overline{MATCH}$ PRT $\cdot$ CNT1 $\cdot$ CNT$\phi$ EDRLOAD = EDR $\cdot$ DATA $\cdot$ DECODE MATCH = EXD2 $\cdot \overline{CNT2}$ + $\overline{EXD2} \cdot$ CNT2 + EXD1 $\cdot \overline{CNT1}$ + $\overline{EXD1} \cdot$ CNT1 + EXD$\phi \cdot \overline{CNT\phi}$ + $\overline{EXD\phi} \cdot$ CNT$\phi$ ACTPRT = C1 $\cdot$ C$\phi$ PRTHME = C1 $\cdot$ C$\phi \cdot$ HMEPLES $\cdot$ PRT $\cdot \overline{EDLINE}$ + $\overline{C1} \cdot$ C$\phi \cdot$ HMEPLES $\cdot$ PRT

TABLE A-2

PLA2 Control Section

| CONTROL SECTION | NAME OF F/F | TYPE OF F/F | INPUT COND. | RESET Cond. |
|---|---|---|---|---|
| Home Detect and Control | HD2 | T | $T_{HD2}$ | RSTALL |
| | HD1 | T | $T_{HD1}$ | RSTALL |
| | HD$\phi$ | T | $T_{HD\phi}$ | RSTALL |
| | CC3 | T | $T_{CC3}$ | RSTCCDC |
| | CC2 | T | $T_{CC2}$ | RSTCCDC |
| | CC1 | T | $T_{CC1}$ | RSTCCDC |
| | CC$\phi$ | T | $T_{CC\phi}$ | RSTCCDC |
| | DC3 | T | $T_{DC3}$ | RSTCCDC |
| | DC2 | T | $T_{DC2}$ | RSTCCDC |
| | DC1 | T | $T_{DC1}$ | RSTCCDC |
| | DC$\phi$ | T | $T_{DC\phi}$ | RSTCCDC |
| RAM Address Control and Refresh | F4 | T | $T_{F4}$ | RSTCCDC |
| | F3 | T | $T_{F3}$ | RSTCCDC |
| | F2 | T | $T_{F2}$ | RSTCCDC |
| | F1 | T | $T_{F1}$ | RSTCCDC |
| | F$\phi$ | T | $T_{F\phi}$ | RSTCCDC |
| | LC3 | T | $T_{LC3}$ | RSTCCDC |
| | LC2 | T | $T_{LC2}$ | RSTCCDC |
| | LC1 | T | $T_{LC1}$ | RSTCCDC |
| | LC$\phi$ | T | $T_{LC\phi}$ | RSTCCDC |
| | HC1 | T | $T_{HC1}$ | RSTCCDC |
| | HC$\phi$ | T | $T_{HC\phi}$ | RSTCCDC |
| Direction | FWD | T | $T_{FWD}$ | RSTALL |
| ROM Access Control | ACCROM | T | $T_{ACC}$ | RSTALL |
| | RAMFULL | T | $T_{RAMFULL}$ | RSTCCDC |
| | SCOMPT | T | $T_{SCOMPT}$ | RSTALL |

The home detection and control logic counts the number of dot positions and times out to six milliseconds to get a home position. The logic also counts the number of characters and the number of dots in a row.

The RAM control and refresh logic refreshes the RAM 80 and manages the address for the ROM 52 from the RAM. When the logic is not sending address to the character ROM 52, the logic goes through a refresh cycle to protect the memory in the RAM 80.

The direction logic generates forward (FWD) or backward ($\overline{FWD}$) state by sensing the home information from the DOTPOS inputs. A forward state will encode the 15th bit of the serial address true when this chip is accessing the character ROM 52 and the character ROM will return a dot row of the character in correct order.

The ROM access control controls the ROM access time wherein the first access time starts at the second home position after the MTRON becomes true. The second access time occurs immediately after the first row of the first character is printed and follows this order in sequence. The ROM 52 is accessed serially by the printer control chip 50 for both transmitting and receiving data. The serial address is 15 bits long which includes 8 bits of character code, 4 bits of row address, and 3 bits of control code information. The serial data is 14 bits long which includes 12 bits for a dot row and 2 bits for control code information.

The logic equations of PLA2 are as follows:

$T_{HD\phi}$ = HD2 . HD1 . $\overline{HD\phi}$ . CC2 . DC3 . $\overline{DC2}$ . DC1 . DC$\phi$ . F4 . F3 . F2 . F1 . F$\phi$ . $\overline{MEM}$ + $\overline{HD2}$ . $\overline{HD1}$ . DOT . MTRON + HD2 . HD1 . HD$\phi$ . DOT . 9 FONT . CC3 . $\overline{CC2}$ . $\overline{CC1}$ . CC$\phi$ . DC3 . $\overline{DC2}$ . DC1 . DC$\phi$ + HD2 . HD1 . HD$\phi$ . DOT . 7 FONT . CC3 . $\overline{CC2}$ . $\overline{CC1}$ . CC$\phi$ . DC3 . $\overline{DC2}$ . $\overline{DC1}$ . DC$\phi$ $T_{HD1}$ = DOT . HD$\phi$ . $\overline{HD2 . HD1}$ $T_{HD2}$ = DOT . $\overline{HD2}$ . HD1 . HD$\phi$ PRTENABLE = ACTPRT . HD2 . HD1 . HD$\phi$ RSTFSLEW = HD2 . HD1 . HD$\phi$ . DOT . $\overline{CC3}$ . $\overline{CC2}$ CC1 . CC$\phi$ RSTTIMER = HD2 . HD1 . $\overline{HD\phi}$ . DOT $T_{DC\phi}$ = HD2 . HD1 . HD$\phi$ . DOT + HD2 . HD1 . $\overline{HD\phi}$ . F4 . F3 . F2 . F1 . F$\phi$ . $\overline{MEM}$ $T_{DC1}$ = HD2 . HD1 . HD$\phi$ . DOT . 9 FONT . DC$\phi$ + HD2 . HD1 . HD$\phi$ . DOT . DC$\phi$ . 7 FONT . $\overline{DC3}$ . $\overline{DC2}$ . $\overline{DC1}$ . DC$\phi$ + HD2 . HD1 . $\overline{HD\phi}$ . F4 . F3 . F2 . F1 . F$\phi$ . $\overline{MEM}$ . DC$\phi$ $T_{DC2}$ = HD2 . HD1 . HD$\phi$ . DOT . $\overline{DC3}$ . DC1 . DC$\phi$ + HD2 . HD1 . $\overline{HD\phi}$ . $\overline{DC3}$ . DC1 . DC$\phi$ . F4 . F3 . F2 . F1 . F$\phi$ . $\overline{MEM}$ $T_{DC3}$ = HD2 . HD1 . HD$\phi$ . DOT . DC2 . DC1 . DC$\phi$ + HD2 . HD1 . HD$\phi$ . DOT . 7 FONT . DC3 . DC$\phi$ + HD2 . HD1 . HD$\phi$ . DOT . 9 FONT . DC3 . DC1 . DC$\phi$ + HD2 . HD1 . $\overline{HD\phi}$ . DC2 . DC1 . DC$\phi$ . F4 . F3 . F2 . F1 . F$\phi$ . $\overline{MEM}$ + HD2 . HD1 . $\overline{HD\phi}$ . DC3 . DC1 . DC$\phi$ . F4 . F3 . F2 . F1 . F$\phi$ . $\overline{MEM}$ HMEPLS = HD2 . HD1 . $\overline{HD\phi}$ . CC2 . DC3 . $\overline{DC2}$ . DC1 . DC$\phi$ . F4 . F3 . F2 . F1 . F$\phi$ . $\overline{MEM}$ $T_{CC\phi}$ = HD2 . HD1 . HD$\phi$ . DOT . 9 FONT . DC3 . $\overline{DC2}$ . DC1 . DC$\phi$ + HD2 . HD1 . HD$\phi$ . DOT . 7 FONT . DC3 . $\overline{DC2}$ . $\overline{DC1}$ . DC$\phi$ + HD2 . HD1 . $\overline{HD\phi}$ . DC3 . $\overline{DC2}$ . DC1 . DC$\phi$ . F4 . F3 . F2 . F1 . F$\phi$ . $\overline{MEM}$ . $\overline{CC2}$ -continued $T_{CC1}$ = HD2 . HD1 . HD$\phi$ . DOT . 9 FONT . DC3 . $\overline{DC2}$ . DC1 . DC$\phi$ .
$\overline{CC3}$ . CC$\phi$ + HD2 . HD1 . HD$\phi$ . DOT . 7 FONT . DC3 . $\overline{DC2}$ .
$\overline{DC1}$ . DC$\phi$ . $\overline{CC3}$ . CC$\phi$ + HD2 . HD1 . $\overline{HD\phi}$ . DC3 . $\overline{DC2}$ . DC1 .
DC$\phi$ . F4 . F3 . F2 . F1 . F$\phi$ . $\overline{MEM}$ . CC$\phi$ $T_{CC2}$ = HD2 . HD1 . HD$\phi$ . DOT . 9 FONT . DC3 . $\overline{DC2}$ . DC1 . DC$\phi$ .
CC1 . CC$\phi$ + HD2 . HD1 . HD$\phi$ . DOT . 7 FONT . DC3 . $\overline{DC2}$ .
$\overline{DC1}$ . DC$\phi$ . CC1 . CC$\phi$ + HD2 . HD1 . $\overline{HD\phi}$ . DC3 . $\overline{DC2}$ . DC1 .
DC$\phi$ . F4 . F3 . F2 . F1 . F$\phi$ . $\overline{MEM}$ . CC1 . CC$\phi$ + HD2 .
HD1 . $\overline{HD\phi}$ . DC3 . $\overline{DC2}$ . DC1 . DC$\phi$ . F4 . F3 . F2 . F1 .
F$\phi$ . $\overline{MEM}$ . CC2

$T_{CC3}$ = HD2 . HD1 . HD$\phi$ . DOT . 9 FONT . DC3 . $\overline{DC2}$ . DC1 . DC$\phi$ .
CC2 . CC1 . CC$\phi$ + HD2 . HD1 . HD$\phi$ . DOT . 7 FONT . DC3 .
$\overline{DC2}$ . $\overline{DC1}$ . DC$\phi$ . CC2 . CC1 . CC$\phi$ + HD2 . HD1 . HD$\phi$ . DOT .
9 FONT . DC3 . $\overline{DC2}$ . DC1 . DC$\phi$ . CC3 . CC$\phi$ + HD2 . HD1 .
HD$\phi$ . DOT . 7 FONT . DC3 . $\overline{DC2}$ . $\overline{DC1}$ . DC$\phi$ . CC3 . CC$\phi$ $T_{HC\phi}$ = WRADSADJ . LC3 . $\overline{LC2}$ . $\overline{LC1}$ . LC$\phi$ . $\overline{HC1}$ . HC$\phi$ + RDADSADJ .
MTRON + HD2 . HD1 . $\overline{HD\phi}$ . CC2 . DC3 . $\overline{DC2}$ . DC1 . DC$\phi$ .
F4 . F3 . F2 . F1 . F$\phi$ . $\overline{MEM}$ . $\overline{DOTPOS}$ $T_{HC1}$ = WRADSADJ . LC3 . $\overline{LC2}$ . $\overline{LC1}$ . LC$\phi$ . $\overline{HC1}$ . HC$\phi$ + RDADSADJ .
$\overline{FWD}$ . $\overline{HC\phi}$ + RDADSADJ . $\overline{FWD}$ . HC$\phi$ + HD2 . HD1 . $\overline{HD\phi}$ . CC2 .
DC3 . $\overline{DC2}$ . DC1 . DC$\phi$ . F4 . F3 . F2 . F1 . F$\phi$ . $\overline{MEM}$ .
$\overline{DOTPOS}$ $T_{LC\phi}$ = WRADSADJ + FWD . RDADSADJ . $\overline{HC1}$ . $\overline{HC\phi}$ + $\overline{FWD}$ . RDADSADJ .
HC1 . HC$\phi$ + HD2 . HD1 . $\overline{HD\phi}$ . CC2 . DC3 . $\overline{DC2}$ . DC1 . DC$\phi$ .
F4 . F3 . F2 . F1 . F$\phi$ . $\overline{MEM}$ . $\overline{DOTPOS}$ $T_{LC1}$ = WRADSADJ . LC$\phi$ . LC3 . $\overline{LC2}$ . $\overline{LC1}$ . $\overline{LC\phi}$ + $\overline{FWD}$ . RDADSADJ .
HC1 . HC$\phi$ . LC$\phi$ + FWD . RDADSADJ . $\overline{HC1}$ . $\overline{HC\phi}$ . LC$\phi$ $T_{LC2}$ = WRADSADJ . LC1 . LC$\phi$ + FWD . RDADSADJ . $\overline{HC1}$ . $\overline{HC\phi}$ . $\overline{LC1}$ .
$\overline{LC\phi}$ + $\overline{FWD}$ . RDADSADJ . HC1 . HC$\phi$ . LC1 . LC$\phi$ $T_{LC3}$ = WRADSADJ . LC2 . LC1 . LC$\phi$ + WRADSADJ . LC3 . $\overline{LC2}$ . $\overline{LC1}$ .
LC$\phi$ + FWD . RDADSADJ . $\overline{HC1}$ . $\overline{HC\phi}$ . $\overline{LC2}$ . $\overline{LC1}$ . $\overline{LC\phi}$ + $\overline{FWD}$ .
RDADSADJ . HC1 . HC$\phi$ . LC2 . LC1 . LC$\phi$ + HD2 . HD1 . $\overline{HD\phi}$ .
CC2 . DC3 . $\overline{DC2}$ . DC1 . DC$\phi$ . F4 . F3 . F2 . F1 . F$\phi$ .
$\overline{MEM}$ . $\overline{DOTPOS}$ RAMFULL = $\overline{MTRON}$ . HC1 . HC$\phi$ . LC3 . $\overline{LC2}$ . $\overline{LC1}$ . LC$\phi$ . CASIN .
WRADSADJ . $\overline{RAMFULL}$ $R_{S\phi}$ = MEM . LC$\phi$ + $\overline{MEM}$ . F$\phi$ $R_{S1}$ = MEM . LC1 + $\overline{MEM}$ . F1

$R_{S2}$ = MEM . LC2 + $\overline{MEM}$ . F2

$R_{S3}$ = MEM . LC3 + $\overline{MEM}$ . F3

$R_{S4}$ = MEM . HC$\phi$ + $\overline{MEM}$ . F4

$T_{F\phi}$ = $\overline{MEM}$ $T_{F1}$ = $\overline{MEM}$ . F$\phi$ $T_{F2}$ = $\overline{MEM}$ . F1 . F$\phi$ $T_{F3}$ = $\overline{MEM}$ . F2 . F1 . F$\phi$ $T_{F4}$ = $\overline{MEM}$ . F3 . F2 . F1 . F$\phi$ SHIFT1 = ACTPRT . DOT . $\overline{ACCROM}$ + ACTPRT . HD2 . HD1 . HD$\phi$ . $\overline{DC3}$ .
$\overline{DC2}$ . $\overline{DC1}$ . $\overline{DC\phi}$ . CHECK . $\overline{ACCROM}$ . FWD . HC1 . HC$\phi$ +

-continued $$\text{ACTPRT} . \text{HD2} . \text{HD1} . \text{HD}\phi . \overline{\text{DC3}} . \overline{\text{DC2}} . \overline{\text{DC1}} . \overline{\text{DC}\phi} . \text{CHECK} .$$

$$\overline{\text{ACCROM}} . \overline{\text{FWD}} . \overline{\text{HC1}} . \overline{\text{HC}\phi} + \text{VASDATA} . \overline{\text{FWD}} . \overline{\text{HC1}} . \text{HC}\phi +$$

$$\text{VASDATA} . \text{FWD} . \text{HC1} . \text{HC}\phi$$

SHIFT2 = ACTPRT . DOT . $\overline{\text{ACCROM}}$ + ACTPRT . HD2 . HD1 . HD$\phi$ . $\overline{\text{DC3}}$ .

$$\overline{\text{DC2}} . \overline{\text{DC1}} . \overline{\text{DC}\phi} . \text{CHECK} . \overline{\text{ACCROM}} . \text{FWD} . \text{HC1} . \text{HC}\phi +$$

$$\text{ACTPRT} . \text{HD2} . \text{HD1} . \text{HD}\phi . \overline{\text{DC3}} . \overline{\text{DC2}} . \overline{\text{DC1}} . \overline{\text{DC}\phi} . \text{CHECK} .$$

$$\overline{\text{ACCROM}} . \overline{\text{FWD}} . \overline{\text{HC1}} . \overline{\text{HC}\phi} + \text{VASDATA} . \overline{\text{FWD}} . \text{HC1} . \overline{\text{HC}\phi} +$$

$$\text{VASDATA} . \text{FWD} . \overline{\text{HC1}} . \overline{\text{HC}\phi}$$

SHIFT3 = ACTPRT . DOT . $\overline{\text{ACCROM}}$ + ACTPRT . HD2 . HD1 . HD$\phi$ . $\overline{\text{DC3}}$ .

$$\overline{\text{DC2}} . \overline{\text{DC1}} . \overline{\text{DC}\phi} . \text{CHECK} . \overline{\text{ACCROM}} . \text{FWD} . \text{HC1} . \text{HC}\phi +$$

$$\text{ACTPRT} . \text{HD2} . \text{HD1} . \text{HD}\phi . \overline{\text{DC3}} . \overline{\text{DC2}} . \overline{\text{DC1}} . \overline{\text{DC}\phi} . \text{CHECK} .$$

$$\overline{\text{ACCROM}} . \overline{\text{FWD}} . \overline{\text{HC1}} . \overline{\text{HC}\phi} + \text{VASDATA} . \overline{\text{FWD}} . \text{HC1} . \text{HC}\phi +$$

$$\text{VASDATA} . \text{FWD} . \overline{\text{HC1}} . \text{HC}\phi$$

SHIFT4 = ACTPRT . DOT . $\overline{\text{ACCROM}}$ + ACTPRT . HD2 . HD1 . HD$\phi$ . $\overline{\text{DC3}}$ .

$$\overline{\text{DC2}} . \overline{\text{DC1}} . \overline{\text{DC}\phi} . \text{CHECK} . \overline{\text{ACCROM}} . \text{FWD} . \text{HC1} . \text{HC}\phi +$$

$$\text{ACTPRT} . \text{HD2} . \text{HD1} . \text{HD}\phi . \overline{\text{DC3}} . \overline{\text{DC2}} . \overline{\text{DC1}} . \overline{\text{DC}\phi} .$$

$$\text{CHECK} . \overline{\text{ACCROM}} . \overline{\text{FWD}} . \overline{\text{HC1}} . \overline{\text{HC}\phi} + \text{VASDATA} . \overline{\text{FWD}} . \overline{\text{HC1}} .$$

$$\overline{\text{HC}\phi} + \text{VASDATA} . \text{FWD} . \text{HC1} . \overline{\text{HC}\phi}$$

SHIFTALL = ACTPRT . DOT . $\overline{\text{ACCROM}}$ + ACTPRT . HD2 . HD1 . HD$\phi$ .

$$\overline{\text{DC3}} . \overline{\text{DC2}} . \overline{\text{DC1}} . \overline{\text{DC}\phi} . \text{CHECK} . \overline{\text{ACCROM}} . \text{FWD} . \text{HC1} .$$

$$\text{HC}\phi + \text{ACTPRT} . \text{HD2} . \text{HD1} . \text{HD}\phi . \overline{\text{DC3}} . \overline{\text{DC2}} . \overline{\text{DC1}} . \overline{\text{DC}\phi} .$$

$$\text{CHECK} . \overline{\text{ACCROM}} . \overline{\text{FWD}} . \overline{\text{HC1}} . \overline{\text{HC}\phi}$$

START CHAIN = PRTHME + RDADSADJ . FWD . $\overline{\text{HC1}}$ . $\overline{\text{HC}\phi}$ . ACTPRT +

$$\text{RDADSADJ} . \overline{\text{FWD}} . \overline{\text{HC1}} . \overline{\text{HC}\phi} . \text{ACTPRT} + \text{HD2} . \text{HD1} .$$

$$\text{HD}\phi . 9 \text{ FONT} . \text{DC3} . \overline{\text{DC2}} . \text{DC1} . \overline{\text{DC}\phi} . \text{DOT} . \text{ACTPRT}$$

$$+ \text{HD2} . \text{HD1} . \text{HD}\phi . 7 \text{ FONT} . \text{DC3} . \overline{\text{DC2}} . \overline{\text{DC1}} . \overline{\text{DC}\phi} .$$

$$\text{DOT} . \text{ACTPRT}$$

$T_{FWD}$ = HD2 . HD1 . $\overline{\text{HD}\phi}$ . CC2 . DC3 . $\overline{\text{DC2}}$ . DC1 . DC$\phi$ . F4 . F3 .

$$\text{F2} . \text{F1} . \text{F}\phi . \overline{\text{MEM}} . \overline{\text{DOTPOS}} . \text{FWD}$$

$T_{SCOMPT}$ = COMPLETE $T_{ACCROM}$ = PRTHME + FWD . HC1 . HC$\phi$ . COMPLETE . ACCROM . SCOMPT $$+ \overline{\text{FWD}} . \overline{\text{HC1}} . \overline{\text{HC}\phi} . \text{COMPLETE} . \text{ACCROM} . \text{SCOMPT} + \text{HD2} .$$

$$\text{HD1} . \text{HD}\phi . 9 \text{ FONT} . \text{DC3} . \overline{\text{DC2}} . \text{DC1} . \overline{\text{CD}\phi} . \text{DOT} .$$

$$\text{ACTPRT} + \text{HD2} . \text{HD1} . \text{HD}\phi . 7 \text{ FONT} . \text{DC3} . \overline{\text{DC2}} . \overline{\text{DC1}} .$$

$$\overline{\text{DC}\phi} . \text{DOT} . \text{ACTPRT}$$

In the Tables A-1 and A-2, the status of the command signals or pulses is indicated by T with the subscript notation, such as $T_{PRT}$. In the equations, RDADSADJ is a pulse for the RAM address increment after each memory read during reverse direction of printing and a pulse for the RAM address decrement during forward direction of printing. SHIFT 1-SHIFT 4 indicate that the dot data received from the character ROM are shifted into the respective dot data registers, and SHIFTALL are pulses of dot data shifting out of the registers for printing.

Figure 10:
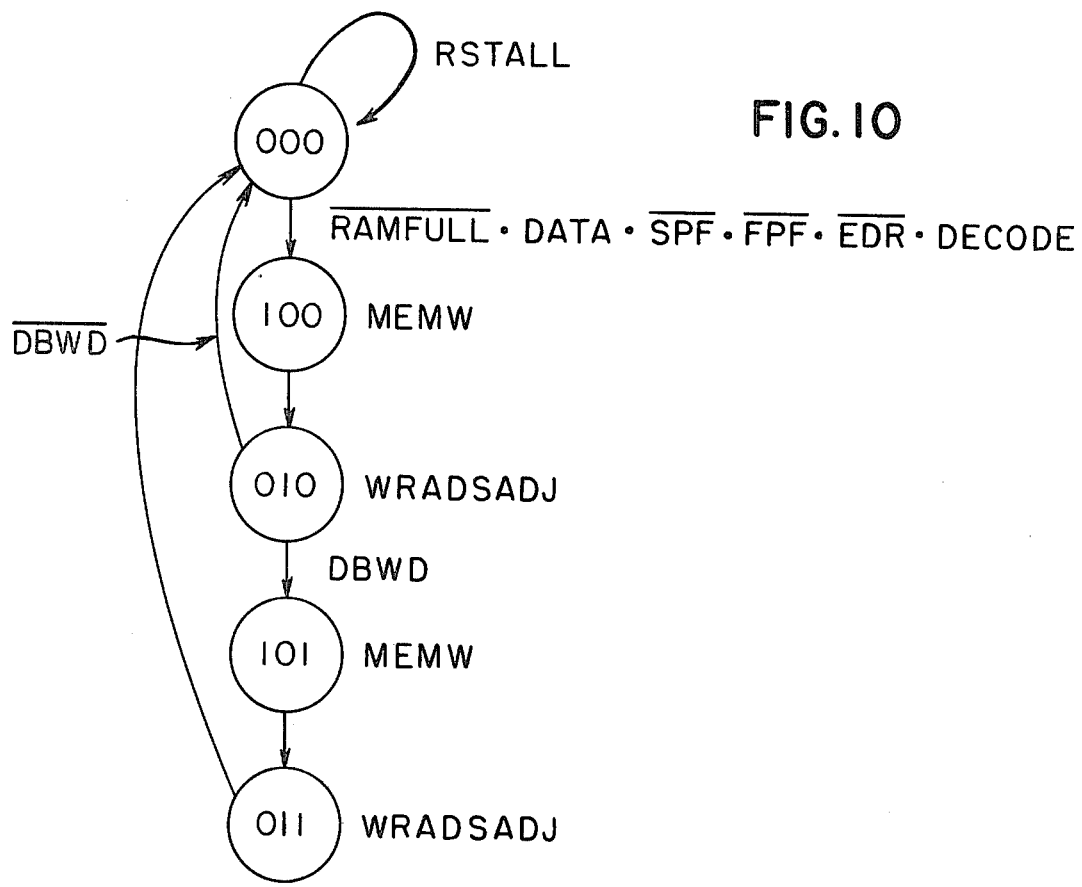
FIG. 10 is a flow diagram of the data input timing chain.

The flow diagrams shown in FIGS. 10-20, inclusive, provide step by step logic of the printer in the operation. FIG. 10 illustrates the data input timing chain (TC2, TC1, and TC$\phi$) wherein TC2=MEMW (memory writing period) and TC1= WRADSADJ (a pulse for the RAM address increment after each memory write). This timing chain is the print data being written into the RAM 80 with the data being written twice when a double width character command is received. DATA is the print data indicator wherein $\overline{\text{D7}} \cdot \text{D6} \cdot \overline{\text{D5}} \cdot \text{D4} = 1$ and DECODE is a time period for the print data decoding.

Figure 11:
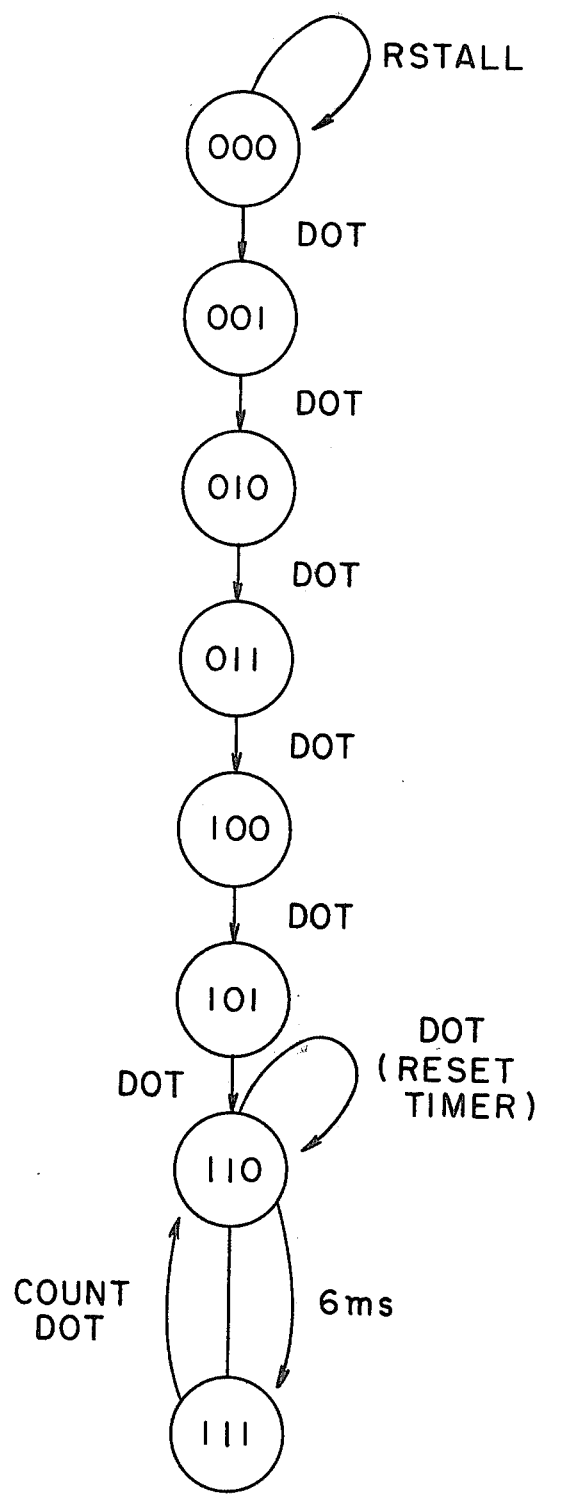
FIG. 11 is a flow diagram of the home detect control.

FIG. 11 shows the flow diagram of the home detect control (HD2, HD1, HD$\phi$) wherein 6 milliseconds = $\overline{\text{C}} \cdot \overline{\text{C3}} \cdot \text{CC2} \cdot \overline{\text{CC1}} \cdot \overline{\text{CC}\phi} \cdot \text{DC3} \cdot \overline{\text{DC2}} \cdot \text{DC1} \cdot \text{DC}\phi \cdot \text{F4} \cdot \text{F3} \cdot \text{F2} \cdot \overline{\text{F}} \cdot \text{1} \cdot \text{F}\phi \cdot \overline{\text{MEM}}$. The count dot = 9 FONT$\cdot$DOT$\cdot$CC3$\cdot\overline{\text{CC}}$2$\cdot\overline{\text{CC1}}\cdot$CC$\phi\cdot$DC3$\cdot\overline{\text{DC2}}\cdot$DC1$\cdot$DC$\phi$ = 7 FONT$\cdot$DOT$\cdot$CC3$\cdot\overline{\text{CC2}}\cdot\overline{\text{CC1}}\cdot$CC$\phi\cdot$DC3$\cdot\overline{\text{DC2}}\cdot\overline{\text{DC1}}\cdot$DC$\phi\cdot$DOT = DOTPL + DOTPT. When the motor 14 is turned on, the optical sensor 56 must sense six edges (DOT) of the DOTPOS pulses prior to starting a home search. State 110 is for the purpose of home searching and state 111 is for counting the number of dot position pulses as well as the number of dot columns for one sweep of the sensor. RSTALL in the various figures and in the Tables A-1 and A-2 indicates a resetting of the flip-flops, and RSTTIMER is the resetting of the HOME search timer.

Figure 12:
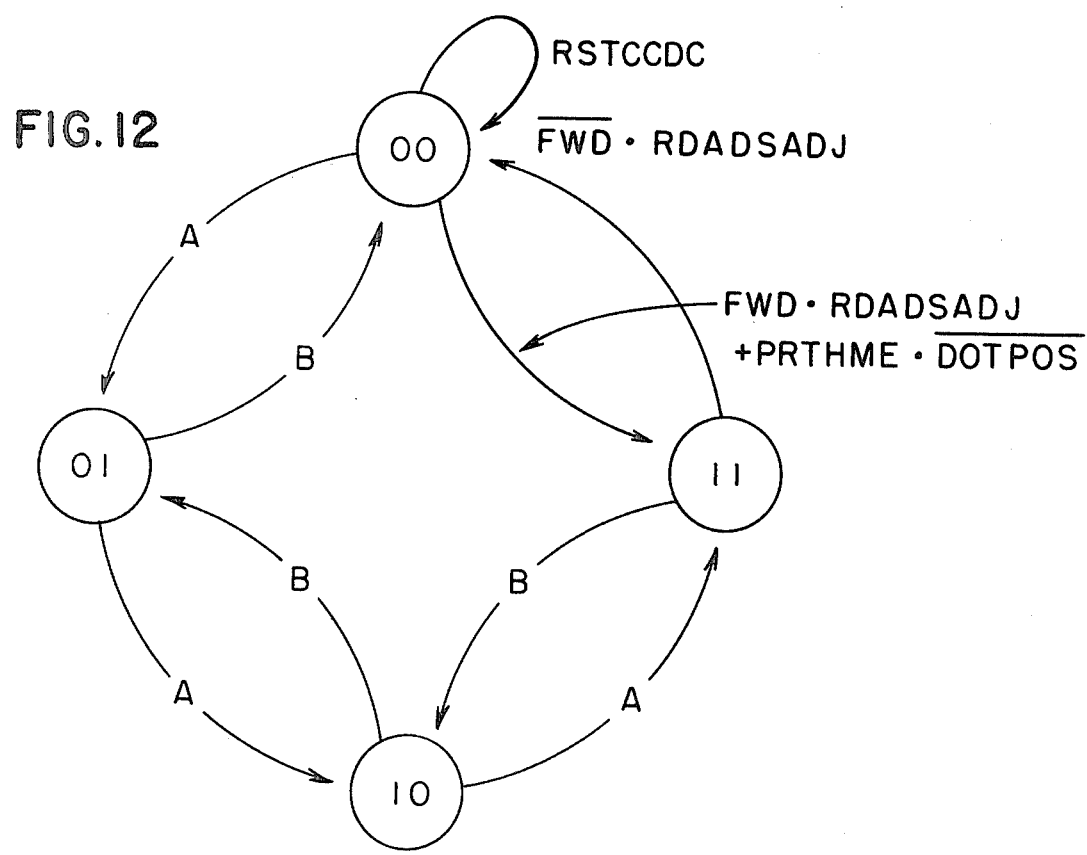
FIG. 12 is a flow diagram of the high order address counter.

FIG. 12 illustrates the flow diagram of the higher order address counter (HC1, HC$\phi$) wherein A=$\overline{\text{FWD}}$·RDADSADJ+WRADSADJ·LC3·$\overline{\text{LC2}}$·$\overline{\text{LC1}}$·LC$\phi$ and B=FWD·RDADSADJ. The high order address is the print data address of the RAM 80 for each print solenoid 24. The A condition is for data being written into the memory or for data being read out when the printer is printing in the reverse direction. The B condition is for data being read out when it is printing in the forward direction. PRTHME is the detected HOME position during printing.

Figure 13:
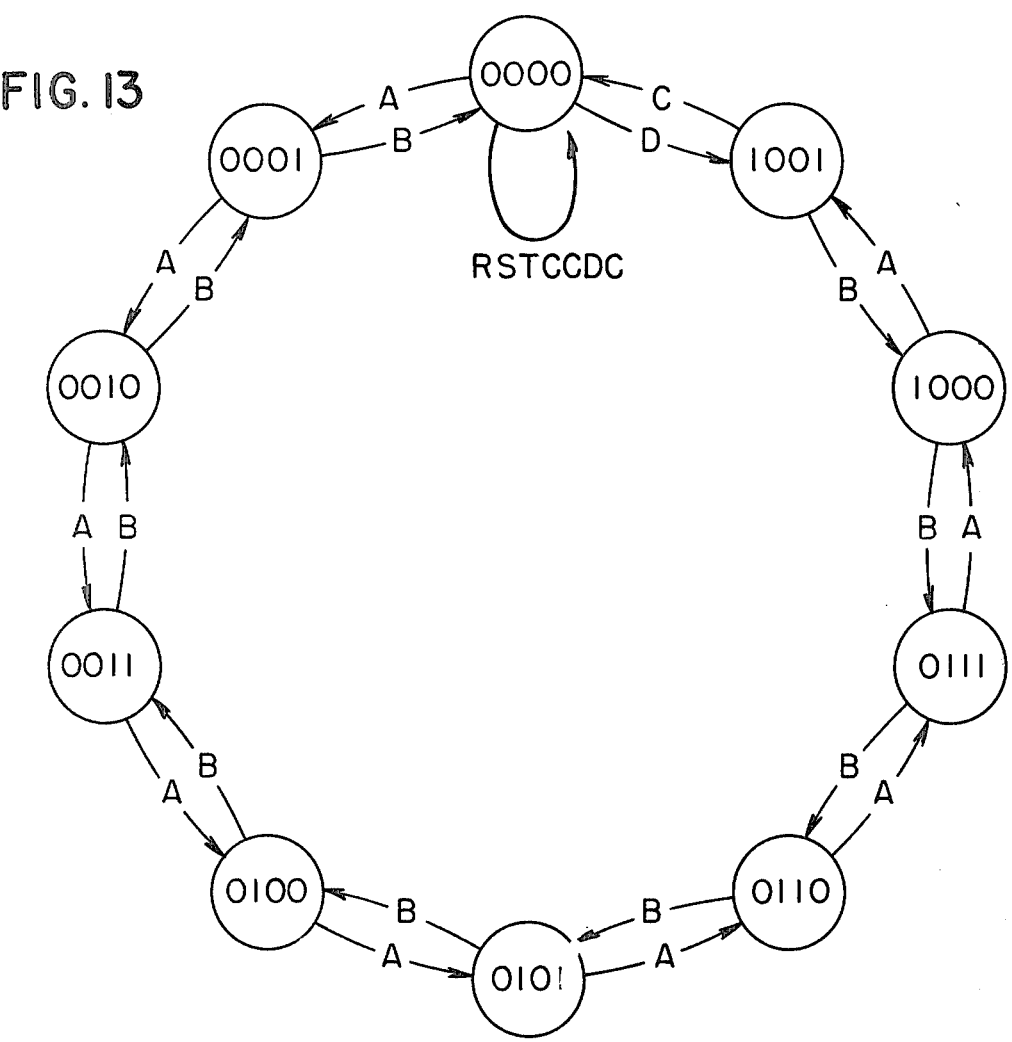
FIG. 13 is a flow diagram of the low order address counter.

FIG. 13 shows the flow diagram of the low order address counter ($\underline{\text{LC3}}$, LC2, LC1, LC$\phi$) wherein A=-WRADSADJ+FWD·RDADSADJ HC1·HC$\phi$, B=FWD·RDADSADJ·$\overline{\text{HC1}}$·$\overline{\text{HC}\phi}$, C=$\overline{\text{FWD}}$·RDADSADJ·HC1·HC$\phi$+WRADSADJ·$\overline{\text{HC1}}$·$\overline{\text{HC}\phi}$, and D=PRTHME·$\overline{\text{DOTPOS}}$. The low order address counter is the print data address of the RAM 80 for each print solenoid from the first character to the tenth character. Increment or decrement of the counter is dependent upon the A, B, C and D conditions.

Figure 14:
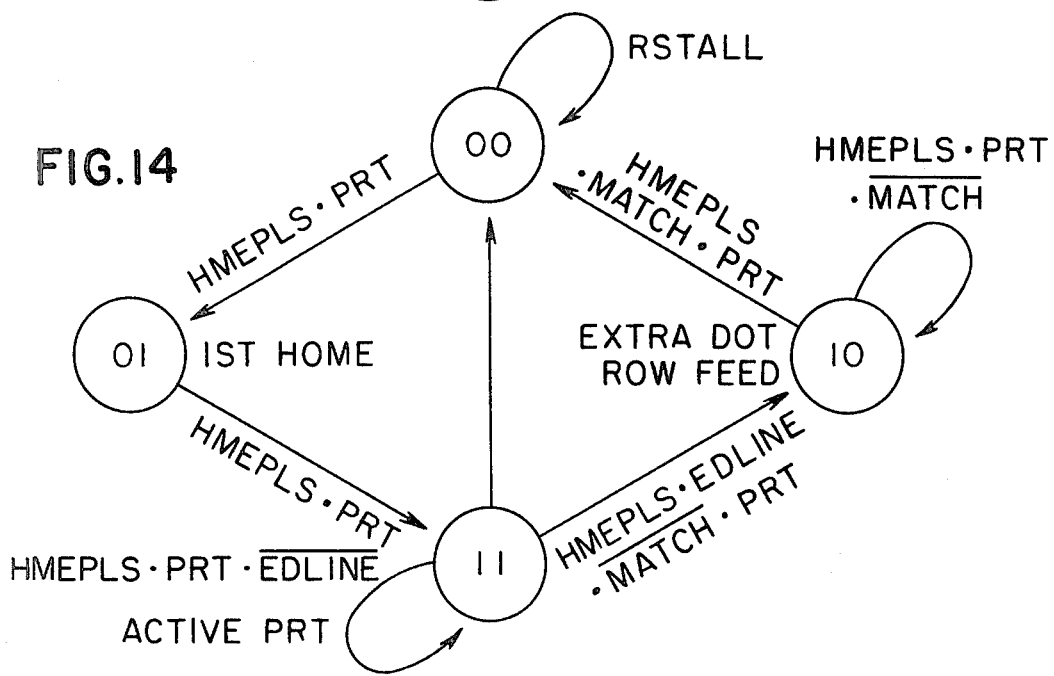
FIG. 14 is a flow diagram of the print sequence control.

FIG. 14 illustrates the flow diagram of print sequence control (C1, C$\phi$) wherein C1 and C$\phi$ are at state 0,0 when the printer is idle, and the state changes to 0,1 when a HOME position is detected after a start to print command is received, after which the printer is active in printing during state 11. In state 10, the printer is feeding an extra dot space until a number is matched with the extra dot number in the register and then goes back to state 00. HME PLS is the HOME position signal, ACTPRT is the active printing mode which is started at the second HOME position after the start to print function is received, and MATCH indicates that the status bits for the extra dot row feed control match the bits in the extra dot row register.

Figure 15:
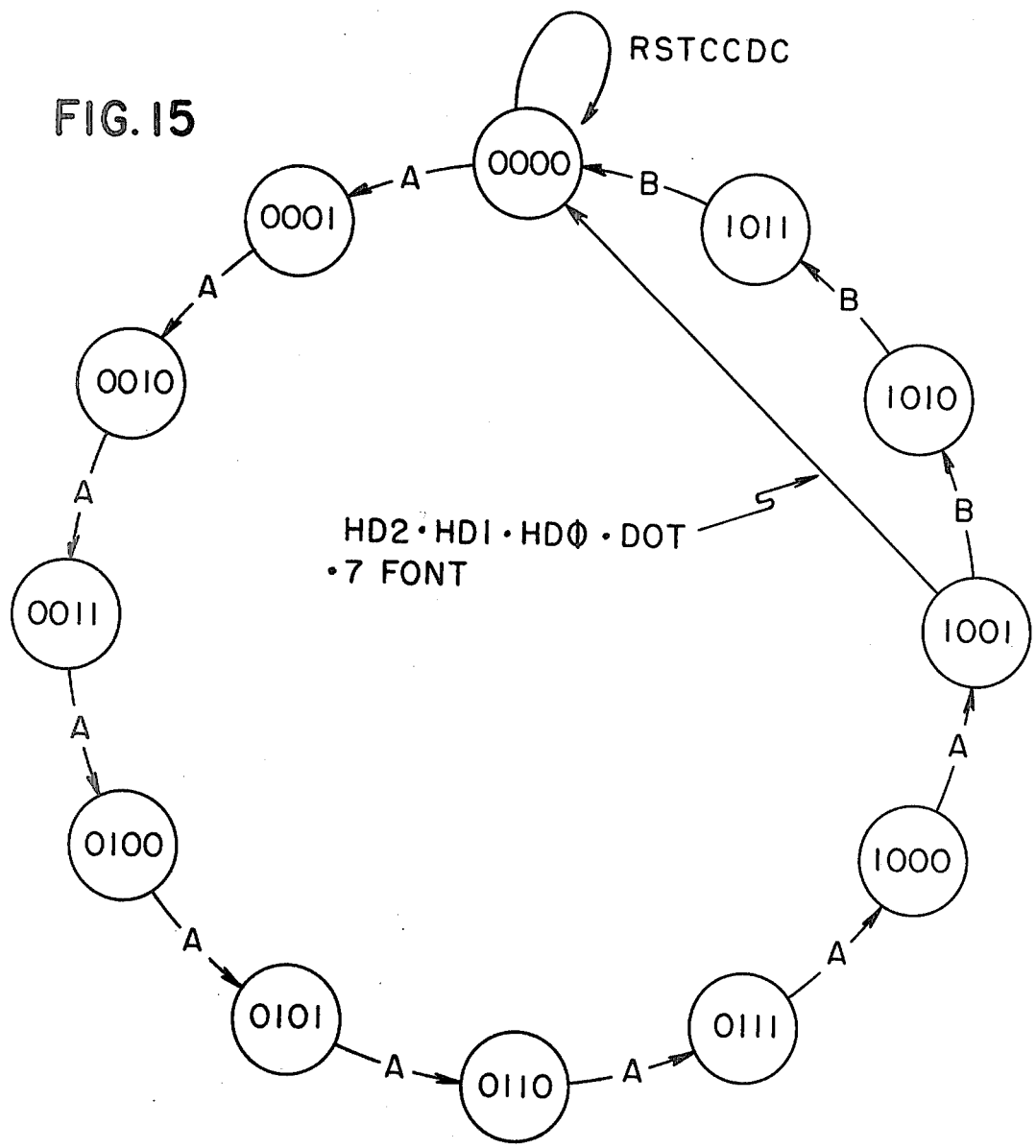
FIG. 15 is a flow diagram of the DOT counter and timer.

FIG. 15 shows the flow diagram of the DOT counter and timer (DC3, DC2, DC1, DC$\phi$) wherein A=HD2·HD1·HD$\phi$·DOT·7 FONT+HD2·HD1·HD$\phi$·DOT·9 FONT+HD2·HD1·$\overline{\text{HD}\phi}$·F4·F3·F2·F1·F$\phi$·$\overline{\text{MEM}}$ and B=HD2·HD1·HD$\phi$·DOT·9 FONT+HD2·HD1·$\overline{\text{HD}\phi}$·F4·F3·F2·F1·F$\phi$·$\overline{\text{MEM}}$. The number of dots per column are counted and are incremented by the A and B conditions. The counter counts to 9 for a 7 font character prior to returning to the 0000 state, and the counter counts to 11 for a 9 font character. Without RAM memory access, the counts are used to refresh the RAM 80. RSTCCDC and CLRCCDC, respectively, indicate the resetting or clearing of the memory address counter, the character counter and the dot counter. CLRALL indicates clearing all registers, memory, and counters except the extra dot row register.

Figure 16:
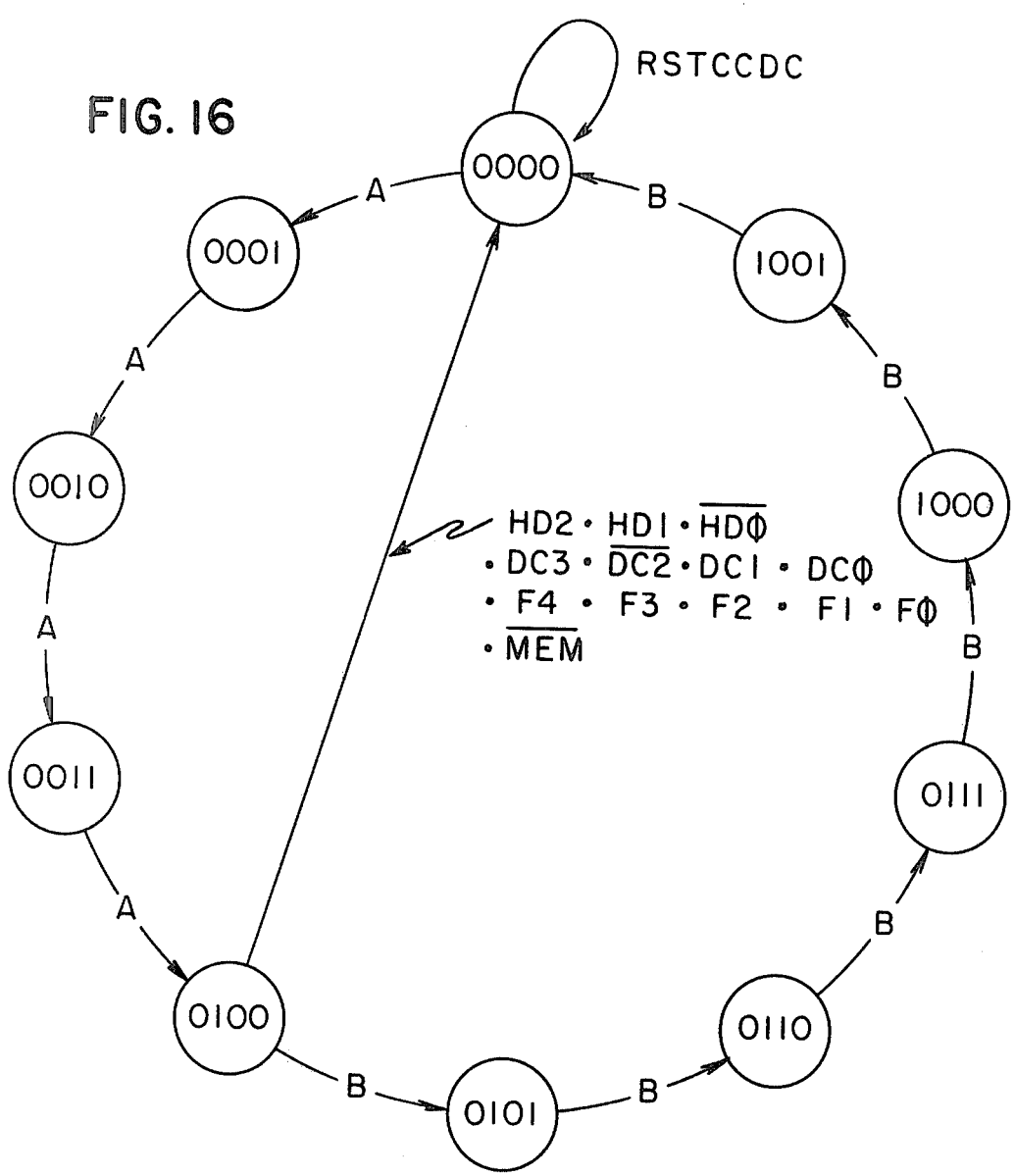
FIG. 16 is a flow diagram of the character counter and timer.

FIG. 16 illustrates the flow diagram of the character counter and timer (CC3, CC2, CC1, CC$\phi$) wherein A=HD2·HD1·HD$\phi$·DOT·DC3·$\overline{\text{DC2}}$·DC1·DC$\phi$·9 FONT +HD2·HD1·HD$\phi$·DOT·DC3·$\overline{\text{DC2}}$·$\overline{\text{DC1}}$·DC$\phi$·7 FONT+HD2·HD1·$\overline{\text{HD}\phi}$·DC3·$\overline{\text{DC2}}$·DC1·DC$\phi$·F4·F3·F2·F1·F$\phi$·$\overline{\text{MEM}}$ and B=HD2·HD1·HD$\phi$·DOT·DC3·$\overline{\text{DC2}}$·DC1·DC$\phi$·9 FONT+HD2·HD1·HD$\phi$·DOT·DC3·$\overline{\text{DC2}}$·$\overline{\text{DC1}}$·DC$\phi$·7 FONT. The number of characters per sweep are counted with ten characters being counted for both 7 or 9 font. For RAM memory refreshing, the count is to four or to the 0100 state and then returns to the 0000 state.

Figure 17:
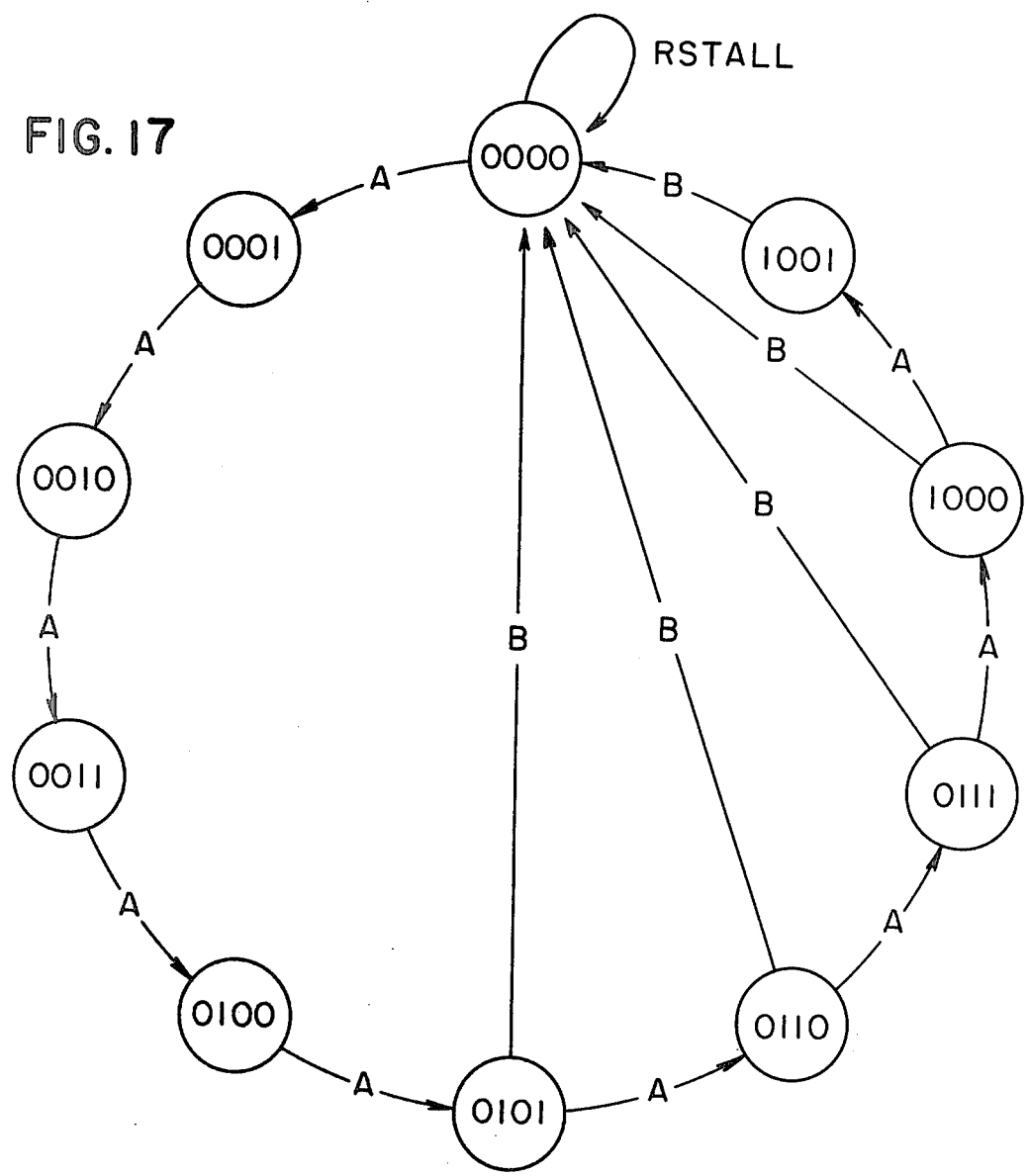
FIG. 17 is a flow diagram of the row counter control.

FIG. 17 shows the flow diagram of the row counter control (RC3, RC2, RC1, RC$\phi$) wherein A=C1·C$\phi$·HMEPLS·$\overline{\text{EDLINE}}$·PRT and B=C1·C$\phi$·HMEPLS·EDLINE·MATCH·PRT+C1·$\overline{\text{C}\phi}$·HMEPLS·MATCH·PRT·RC3, RC2, RC1 and RC$\phi$ comprise the row address for the character ROM 52 and address is incremented by A and B conditions when the print sequence control C1 and C$\phi$ are in states 10 or 11.

Figure 18:
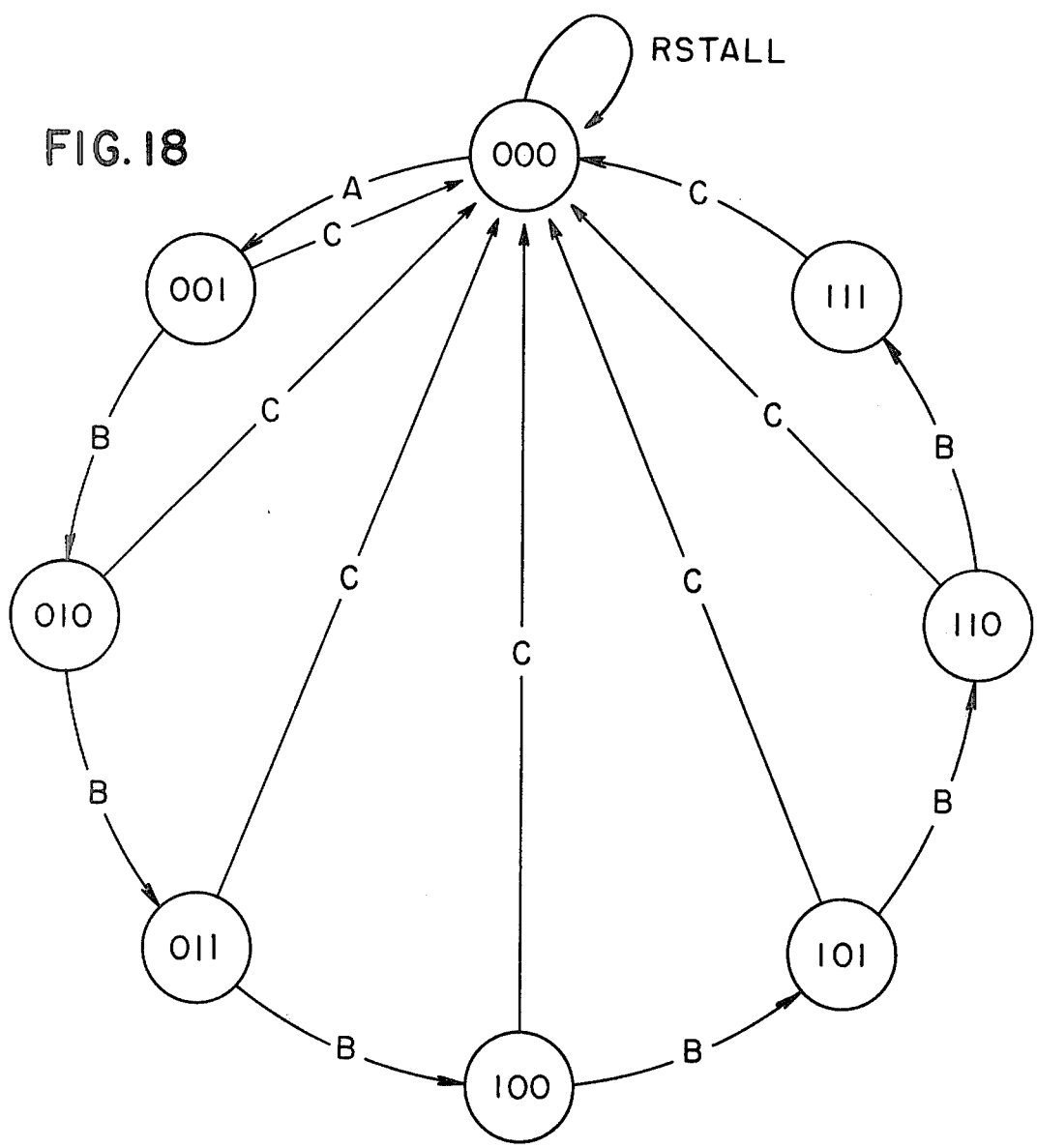
FIG. 18 is a flow diagram of the extra dot row feed control.

FIG. 18 illustrates the flow diagram of the extra dot row feed control (CNT2, CNT1, CNT$\phi$) wherein A=C1·C$\phi$·HEMPLS·EDLINE·$\overline{\text{MATCH}}$·PRT, B=C1·$\overline{\text{C}\phi}$·HMEPLS·$\overline{\text{MATCH}}$·PRT, and C=C1·$\overline{\text{C}\phi}$·HMEPLS·MATCH·PRT. This controls the number of extra dot space feeds after a line of print is completed with the number being determined by the A, B, and C conditions.

Figure 19:
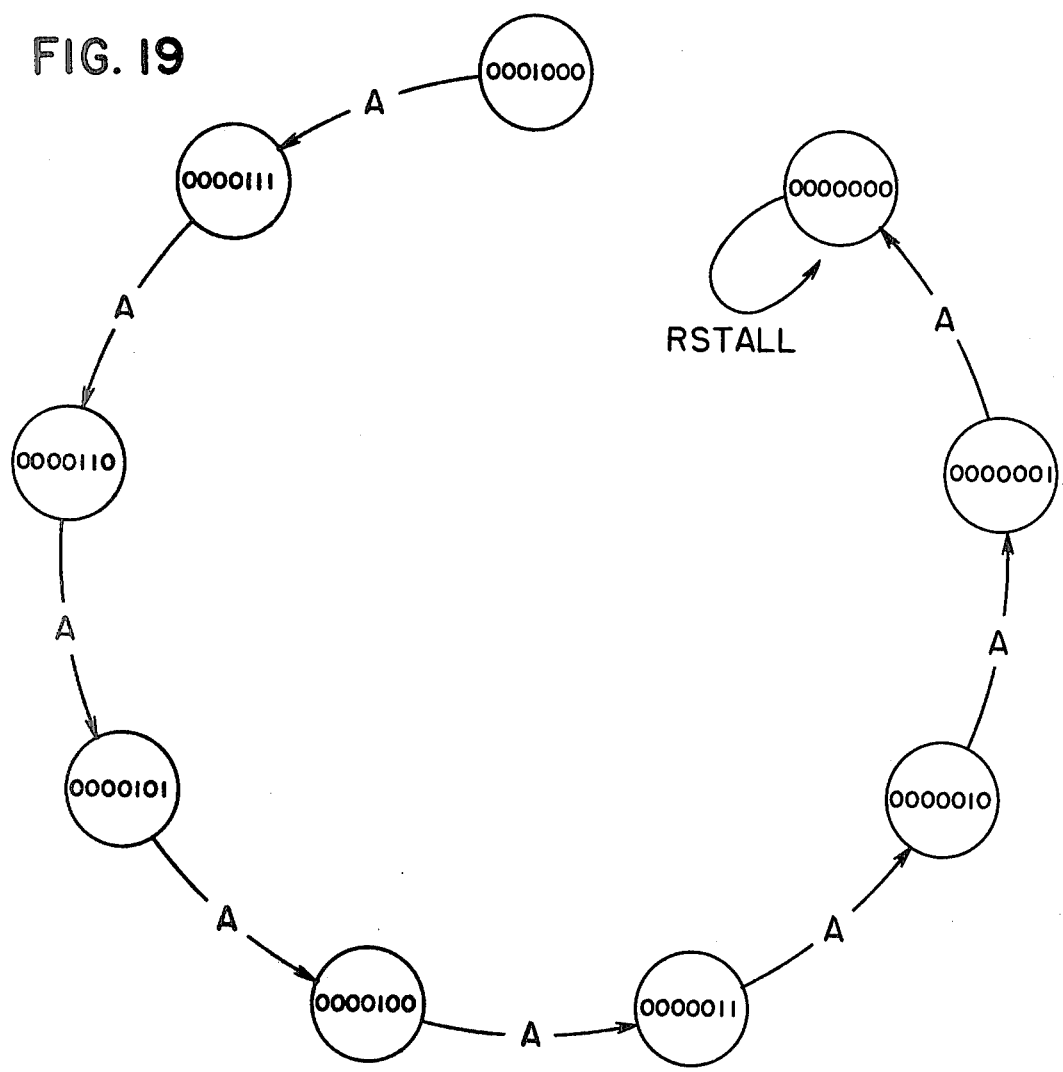
FIG. 19 is an exemplary diagram for paper feed control.

FIG. 19 shows an exemplary diagram of the paper feed control for 8 steps of logic, wherein A=HMEPLS·MTRON·$\overline{\text{PRT}}$.

Figure 20:
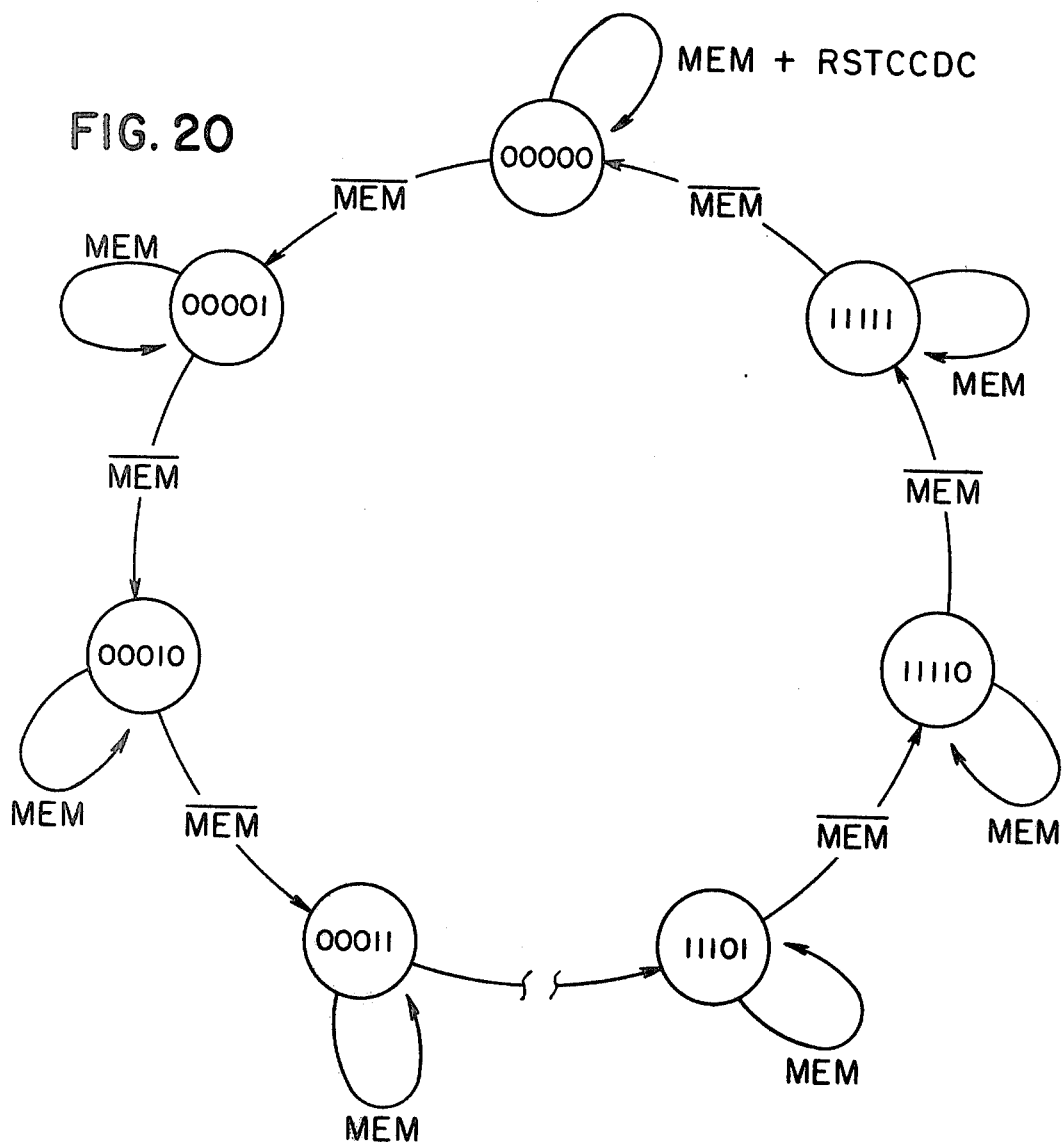
FIG. 20 is a flow diagram of the refresh counter.

FIG. 20 illustrates the flow diagram of the refresh counter (F4, F3, F2, F1, F$\phi$) wherein MEM=MEMW (memory writing period)+MEMR (memory reading period) in the RAM 80. The refresh counter increments to refresh the RAM 80 by locations in order to protect the data from fading out when the RAM is not accessed. The break in the flow line indicates that a number of locations are not shown. Also, of the 40 locations available in the RAM 80, 32 locations are utilized by the five bit refresh counter.

It can thus be seen that the logic equations for PLA1 and PLA2 are derived from the operation of the various flip-flops as required by the commands and the control functions during the printing operation.

In the operation of the control system of the present invention the control logic of the printer flags a busy status when it is printing or counting to advance paper. The logic receives parallel 8 bit character code data for print and 8 bit data for control functions to condition the printer controls. A write signal on the write (WR) line strobes data into the control logic and the print data is stored in the memory 80. The control function data is decoded and stored in the programmable logic unit 82 (PLA1). The motor of the printer is turned on and the busy line (BUSY) goes high when the start print function is received. The carriage oscillates or reciprocates twice which allows the paper to advance two dot spaces before printing takes place. The optical sensor is sensing the dot positions from the leading edge and the trailing edge of the slots in the timing strip. The sensor also detects the home positions at the ends of the strip by counting the times of passing either the window area or the web area. If a dot pulse from one of the slots in the strip does not appear within a certain time, the printer is in a home position. The control logic can recognize the carriage direction of movement during printing by detecting the HOME 1 and the HOME 2 positions prior to printing of the next character.

It is remembered that there are four single print wire solenoids 24 mounted in a line across the printer and each print solenoid prints 10 characters in a line. Before each row of a character prints, the data stored in the memory 80 is taken out for the character memory 52 to generate a dot row for each print solenoid 24 to print. The dot row data is loaded into each hammer register and according to the direction of carriage movement, the dot row data is loaded either forward or backward into the registers. Each dot position generates a hammer pulse which makes the print solenoids 24 fire on a presence of each dot of a dot row. The carriage 22 oscillates seven times for completing a 7 dot high character and nine times for a 9 dot high character to complete a line of printing. At the end of the last scan or oscillation, the motor 14 is turned off and the busy line goes low. For either fast or slow paper feed, the motor 14 of the printer is turned on and the busy line goes high when a paper feed data is received. A 7 bit binary number may be chosen to give from 1 to 127 dot row feeds on the slow paper feed and from 1 to 127 line feeds for the fast paper feed option. The carriage 22 continues to oscillate and the counter will time out the paper advance by counting the number of home positions.

It is thus seen that herein shown and described is a printer of modular design and is controlled by a printer control module of the larger scale integrated type, a character read only memory module and associated circuits. Under control of the two modules, the printer can print out single width characters, double width characters or single width and double width characters in the same line. The printer is controlled in a manner wherein bi-directional printing is capable and a single control module which is programmable to be used in a number of different type printers is accomplished by the invention. The control system as shown and described enables the accomplishment of the objects and advantages mentioned above and while one embodiment of the invention has been disclosed herein, variations thereof beyond those herein mentioned may occur to those skilled in the art. It is contemplated that all such variations not departing from the spirit and scope of the invention hereof are to be construed in accordance with the following claims.

What is claimed is:

1. A control system for a dot matrix printer having a plurality of aligned printing elements, a carriage supporting said printing elements in position to print on record material, means for moving said carriage in reciprocating manner, a timing member having indicia thereon representative of dot column positions of characters to be printed and indicia for indicating direction of travel of said carriage, a sensing member for sensing said dot column positions indicia for initiating pulse signals for operation of said printing elements and for sensing said direction of travel indicating indicia, means for storing print data and control data in random addressable manner and in latching manner, respectively, character memory means receiving said print data and said control data from said storing means for generating a row of dots in character-by-character sequence, means for addressing the character memory means for only those positions along a character line corresponding to the positions of the print elements at that time, means for decoding row and column address for generating a dot row of print data for transmitting decoded data to said character memory means, means for decoding control data for indicating carriage direction of travel and width of characters to be printed, means for registering said generated dot row data for each character to be printed according to direction of movement of said carriage in bi-directional printing as sensed by said sensing member, and means responsive to the decoded print data from said character memory means for operating said printing elements in accordance with the presence of each dot of a dot row for each respective character as determined by said sensing member.

2. The control system of claim 1 wherein said timing member includes carriage home position indicia thereon and said sensing member senses a predetermined number of said dot column positions indicia and said home position indicia for determining the direction of printing.

3. The control system of claim 1 wherein said timing member comprises a strip member having carriage home position indicia comprising an aperture at one end of said strip member and a web area at the other end of said strip member, and wherein the direction of the aperture and the web area determine direction of travel of said carriage.

4. The control system of claim 1 including latching devices for enabling signals to said printing elements.

5. The control system of claim 1 wherein said dot column positions indicia comprise spaced apertures in said timing member, said sensing member detects the leading edge and the trailing edge of each said aperture of said timing member, and there are provided data devices for latching the operation of said printing elements.

6. The control system of claim 1 including a dot row format device and wherein the output of said character memory means is directed to said format device for determining single width and double width character printing in one line thereof.

7. The control system of claim 3 including means for counting the home positions of said timing strip for determining the number of dot rows between lines of characters.

8. A dot matrix printer comprising a:

platen extending across said printer, a carriage movable a predetermined distance lengthwise of said platen, a plurality of printing elements carried by said carriage and aligned with said platen for operating against record media thereover, means for moving said record media in dot line increments in the printing of a line of characters, means for causing reciprocating movement of said carriage and said printing elements, a timing strip secured to said carriage and having a plurality of aligned indicia along the length of said strip, said strip having carriage home positions defining first home indicia at one end of said strip and second home indicia at the other end of said strip, a sensor on said printer sensing a predetermined number of said aligned indicia and said carriage first and second home positions for initiating printing pulses from said aligned indicia and for indicating the position and direction of movement of said carriage from sensing of the respective first and second home positions, means for counting the number of times a home position is sensed for indicating start of printing, memory means receiving input data and storing thereof in random addressable character-by-character manner, means for monitoring input data as print data and as control data for causing printing of the dots in a row thereof as required by each succeeding character to be printed in accordance with said print data, character memory means receiving said print data and said control data for generating a dot row for each character in character-by-character sequence, means for addressing the character memory means for only those positions along a character line corresponding to the positions of the print elements at that time, means for registering the generated dot row for each character to be printed according to direction of movement of said carriage as sensed by said sensor, and means responsive to the accessible print data from said character memory means for operating said printing elements in successive dot rows for each character in printing a line thereof in both directions of carriage movement 9. The printer of claim 8 wherein said aligned indicia comprises a plurality of slots in said timing strip and said first home and second home indicia comprise an aperture in and a web area of said timing strip.

10. The printer of claim 8 including a dot row format device and wherein the output of said character memory means is directed to said dot row format for determining single width and double width character printing in one line thereof.

11. The printer of claim 8 including dot row and column decoders and a control pulse decoder for generating selected pulses for enabling said means for operating said printing elements in successive dot rows for successively printing each character.

12. In a dot matrix printer for printing a line of characters in dot incremental manner, a plurality of printing elements positioned along a line to print on record material, a carriage for carrying said printing elements in one and the other direction a predetermined distance across said printer, a timing strip carried by said carriage, said timing strip having indicia corresponding to dot positions of said characters and to the ends of travel of said carriage, a sensor for sensing said timing strip indicia for initiating operation of said printing elements and for indicating direction of travel of said carriage, memory means for storing print data in random accessible manner, logic array means for storing control data in latching manner, character memory means receiving said print data and said control data for generating a row of dots for printing of characters in character-by-character sequence, means for addressing the character memory means for only those positions along a character line corresponding to the positions of the print elements at that time, means for decoding said control data in accordance with the width of characters to be printed, means for loading dot row data according to direction of movement of said carriage, said means responsive to the print data from said character memory means for operating said printing elements in accordance with said dot row data for successive characters in a line thereof.

13. In the printer of claim 12 including means for decoding row and column address of print data for transmitting decoded data to said character memory means.

14. In the printer of claim 12 including means for counting the number of times said carriage passes an end of travel position.

15. In the printer of claim 12 wherein said timing strip includes a window and a web area at the ends thereof for indicating direction of travel of said carriage.

16. In the printer of claim 12 wherein said printing elements are solenoid operated print wires.

* * * * *

UNITED STATES PATENT OFFICE
CERTIFICATE OF CORRECTION

Patent No. 4,204,777          Dated May 27, 1980

Inventor(s) Tai-Kuang Jen

It is certified that error appears in the above-identified patent and that said Letters Patent are hereby corrected as shown below:

Column 30, line 14, "direction" should be -- detection --.

Signed and Sealed this

Nineteenth Day of August 1980

[SEAL]

Attest:

SIDNEY A. DIAMOND

Attesting Officer          Commissioner of Patents and Trademarks

UNITED STATES PATENT OFFICE
CERTIFICATE OF CORRECTION

Patent No. 4,204,777    Dated May 27, 1980

Inventor(s) Tai-Kuang Jen

It is certified that error appears in the above-identified patent and that said Letters Patent are hereby corrected as shown below:

Column 30, line 14, "direction" should be -- detection --.

Signed and Sealed this

Nineteenth Day of August 1980

[SEAL]

Attest:

SIDNEY A. DIAMOND

Attesting Officer    Commissioner of Patents and Trademarks